(12) United States Patent
Holmberg

(10) Patent No.: US 11,215,767 B2
(45) Date of Patent: Jan. 4, 2022

(54) FIBER OPTIC ADAPTER AND CASSETTE

(71) Applicant: COMMSCOPE TECHNOLOGIES LLC, Hickory, NC (US)

(72) Inventor: Matthew J. Holmberg, Le Center, MN (US)

(73) Assignee: CommScope Technologies LLC, Hickory, NC (US)

( * ) Notice: Subject to any disclaimer, the term of this patent is extended or adjusted under 35 U.S.C. 154(b) by 116 days.

(21) Appl. No.: 16/620,103

(22) PCT Filed: Jun. 7, 2018

(86) PCT No.: PCT/US2018/036466
§ 371 (c)(1),
(2) Date: Dec. 6, 2019

(87) PCT Pub. No.: WO2018/226959
PCT Pub. Date: Dec. 13, 2018

(65) Prior Publication Data
US 2021/0191050 A1    Jun. 24, 2021

Related U.S. Application Data

(60) Provisional application No. 62/516,201, filed on Jun. 7, 2017.

(51) Int. Cl.
*G02B 6/38* (2006.01)
*G02B 6/44* (2006.01)

(52) U.S. Cl.
CPC ......... *G02B 6/3879* (2013.01); *G02B 6/3821* (2013.01); *G02B 6/3825* (2013.01); *G02B 6/3897* (2013.01); *G02B 6/4453* (2013.01)

(58) Field of Classification Search
CPC ........................... G02B 6/3879; G02B 6/4453
See application file for complete search history.

(56) References Cited

U.S. PATENT DOCUMENTS

| 2,805,106 | A | 9/1957 | Penkala |
| 2,864,656 | A | 12/1958 | Yorinks |

(Continued)

FOREIGN PATENT DOCUMENTS

| AU | 40995/85 | 4/1985 |
| AU | 55314/86 | 3/1986 |

(Continued)

OTHER PUBLICATIONS

International Search Report and Written Opinion of the International Searching Authority for International Patent Application No. PCT/US2018/036466 dated Oct. 10, 2018, 12 pages.

(Continued)

*Primary Examiner* — Sung H Pak
(74) *Attorney, Agent, or Firm* — Merchant & Gould P.C.

(57) ABSTRACT

A fiber optic connector port arrangement includes at least one upper receptacle and at least one lower receptacle vertically aligned with the upper receptacle to form a column of receptacles, the column including a center divider that divides the at least one upper receptacle from the at least one lower receptacle, the center divider defining latching shoulders for mating with latches of both a connector to be mounted at the upper receptacle of the column and a connector to be mounted at the lower receptacle of the column.

29 Claims, 39 Drawing Sheets

(56) References Cited

U.S. PATENT DOCUMENTS

| | | |
|---|---|---|
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Rock et al. |
| 4,359,262 A | 11/1982 | Dolan |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,995,688 A | 2/1991 | Anton et al. |
| 5,011,424 A | 4/1991 | Simmons |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,090,916 A | 2/1992 | Magnier |
| 5,100,221 A | 3/1992 | Carney et al. |
| 5,123,071 A | 6/1992 | Mullholland et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,211,572 A | 5/1993 | Comstock et al. |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,315,679 A | 5/1994 | Baldwin et al. |
| 5,316,243 A | 5/1994 | Henneberger |
| 5,323,480 A | 6/1994 | Mullaney et al. |
| 5,335,301 A | 8/1994 | Newman et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowskki et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacame |
| 5,462,457 A | 10/1995 | Schroepfer et al. |
| 5,481,634 A | 1/1996 | Anderson et al. |
| 5,490,229 A | 2/1996 | Ghanderharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,574,812 A | 11/1996 | Beier et al. |
| 5,579,425 A | 11/1996 | Lampert et al. |
| 5,613,030 A | 3/1997 | Hoffer et al. |
| 5,638,474 A | 6/1997 | Lampert et al. |
| 5,640,481 A | 6/1997 | Llewellyn et al. |
| 5,651,690 A | 7/1997 | Kias et al. |
| 5,655,044 A | 8/1997 | Finzel et al. |
| 5,675,682 A | 10/1997 | De Marchi |
| 5,717,810 A | 2/1998 | Wheeler |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Rock |
| 5,887,106 A | 3/1999 | Cheeseman et al. |
| 5,917,984 A | 6/1999 | Röseler et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,024,498 A | 2/2000 | Carlisle et al. |
| 6,027,252 A | 2/2000 | Erdman et al. |
| 6,044,194 A | 3/2000 | Meyerhoefer |
| 6,076,908 A | 6/2000 | Maffeo |
| 6,076,974 A | 6/2000 | Carlisle et al. |
| 6,196,733 B1 | 3/2001 | Wild et al. |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,250,817 B1 | 6/2001 | Lampert et al. |
| 6,250,942 B1 | 6/2001 | Lemke et al. |
| 6,254,418 B1 | 7/2001 | Tharp et al. |
| 6,269,214 B1 | 7/2001 | Naudin et al. |
| 6,276,839 B1 | 8/2001 | De Marchi |
| 6,301,424 B1 | 10/2001 | Hwang |
| 6,325,547 B1 | 12/2001 | Cammons |
| 6,357,934 B1 | 3/2002 | Discoil |
| 6,360,050 B1 | 3/2002 | Moua et al. |
| 6,435,732 B1 | 8/2002 | Asao |
| 6,438,310 B1 | 8/2002 | Lance et al. |
| 6,439,523 B1 | 8/2002 | Chandler et al. |
| 6,443,627 B1 | 9/2002 | Anderson et al. |
| 6,447,170 B1 | 9/2002 | Takahashi et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| RE38,311 E | 11/2003 | Wheeler |
| 6,677,520 B1 | 1/2004 | Kim et al. |
| 6,692,289 B2 | 2/2004 | Nemoto |
| 6,715,619 B2 | 4/2004 | Kim et al. |
| 6,748,155 B2 | 6/2004 | Kim et al. |
| 6,768,860 B2 | 7/2004 | Liberty |
| 6,776,645 B2 | 8/2004 | Roth et al. |
| 6,804,447 B2 | 10/2004 | Smith et al. |
| 6,809,258 B1 | 10/2004 | Dang et al. |
| 6,810,193 B1 | 10/2004 | Müller |
| 6,845,208 B2 | 1/2005 | Thibault et al. |
| 6,863,556 B2 | 3/2005 | Viklund et al. |
| 6,865,331 B2 | 3/2005 | Mertesdorf |
| 6,885,560 B2 | 4/2005 | Zaremba |
| 6,925,241 B2 | 8/2005 | Bohle et al. |
| 6,934,457 B2 | 8/2005 | Mincent et al. |
| 6,945,620 B2 | 9/2005 | Lam et al. |
| 6,968,111 B2 | 11/2005 | Trebesch et al. |
| 6,994,580 B1 | 2/2006 | Chen et al. |
| 7,006,748 B2 | 2/2006 | Dagley et al. |
| 7,037,129 B2 | 5/2006 | Lo et al. |
| 7,052,186 B1 | 5/2006 | Bates |
| 7,068,907 B2 | 6/2006 | Schray |
| 7,079,744 B2 | 7/2006 | Douglas et al. |
| 7,101,212 B1 | 9/2006 | Larkin |
| 7,116,777 B2 | 10/2006 | Knudsen et al. |
| 7,120,348 B2 | 10/2006 | Trebesch et al. |
| 7,163,414 B2 | 1/2007 | Lo et al. |
| 7,171,099 B2 | 1/2007 | Bames et al. |
| 7,281,938 B1 | 10/2007 | Wu |
| 7,297,013 B2 | 11/2007 | Caveney et al. |
| 7,302,153 B2 | 11/2007 | Thom |
| 7,302,154 B2 | 11/2007 | Frebesch et al. |
| 7,308,184 B2 | 12/2007 | Bames et al. |
| 7,326,075 B1 | 2/2008 | Armstrong et al. |
| 7,329,137 B2 | 2/2008 | Martin et al. |

(56) References Cited

U.S. PATENT DOCUMENTS

| | | |
|---|---|---|
| 7,354,292 B1 | 4/2008 | Lloyd et al. |
| 7,367,823 B2 | 5/2008 | Rapp et al. |
| 7,373,071 B2 | 5/2008 | Douglas et al. |
| 7,406,240 B2 | 7/2008 | Murano |
| 7,409,137 B2 | 8/2008 | Barnes |
| 7,413,473 B2 | 8/2008 | Wu |
| 7,416,349 B2 | 8/2008 | Kramer |
| 7,425,159 B2 | 9/2008 | Lin |
| 7,421,181 B2 | 10/2008 | Kanou et al. |
| 7,440,670 B2 | 10/2008 | Kanou et al. |
| 7,445,484 B2 | 11/2008 | Wu |
| 7,460,757 B2 | 12/2008 | Hoehne et al. |
| 7,463,811 B2 | 12/2008 | Trebesch et al. |
| 7,465,180 B2 | 12/2008 | Kusada et al. |
| 7,496,268 B2 | 2/2009 | Escoto et al. |
| 7,499,623 B2 | 3/2009 | Barnes et al. |
| 7,500,790 B2 | 3/2009 | Erdman et al. |
| 7,534,125 B1 | 5/2009 | Schroll |
| 7,534,128 B2 | 5/2009 | Caveney et al. |
| 7,549,888 B1 | 6/2009 | Armstrong et al. |
| 7,588,373 B1 | 9/2009 | Sato et al. |
| 7,594,766 B1 | 9/2009 | Sasser et al. |
| 7,632,125 B2 | 12/2009 | Irwin et al. |
| 7,641,398 B2 | 1/2010 | O'Riorden et al. |
| 7,651,361 B2 | 1/2010 | Henry et al. |
| 7,664,361 B2 | 2/2010 | Trebesch et al. |
| 7,666,023 B2 | 2/2010 | Wu |
| 7,689,089 B2 | 3/2010 | Wagner et al. |
| 7,690,939 B2 | 4/2010 | Wu |
| 7,706,656 B2 | 4/2010 | Zimmel |
| 7,715,681 B2 | 5/2010 | Krampotich et al. |
| 7,736,171 B2 | 6/2010 | Reed et al. |
| 7,747,125 B1 | 6/2010 | Lee et al. |
| RE41,460 E | 7/2010 | Wheeler |
| 7,751,674 B2 | 7/2010 | Hill |
| 7,753,710 B2 | 7/2010 | George |
| 7,764,859 B2 | 7/2010 | Krampotich et al. |
| 7,771,225 B1 | 8/2010 | Wu |
| 7,856,166 B2 | 12/2010 | Biribuze et al. |
| 7,869,683 B2 | 1/2011 | Barnes et al. |
| 7,876,993 B2 | 1/2011 | Krampotich et al. |
| 7,889,961 B2 | 2/2011 | Cote et al. |
| 7,892,012 B1 | 2/2011 | Foung |
| 8,027,558 B2 | 9/2011 | Barnes et al. |
| 8,059,932 B2 | 11/2011 | Hill et al. |
| 8,078,030 B2 | 12/2011 | Frebesch et al. |
| 8,152,384 B2 | 4/2012 | De Jong et al. |
| 8,152,385 B2 | 4/2012 | De Jong et al. |
| 8,187,018 B2 | 5/2012 | Kosugi |
| 8,195,022 B2 | 6/2012 | Coburn et al. |
| 8,221,007 B2 | 7/2012 | Peterhans et al. |
| 8,235,745 B1 | 8/2012 | Armstrong et al. |
| 8,267,712 B2 | 9/2012 | Huang et al. |
| 8,285,104 B2 | 10/2012 | Davis et al. |
| 8,317,532 B2 | 11/2012 | Kosugi |
| 8,382,506 B2 | 2/2013 | Reed et al. |
| 8,452,149 B2 | 5/2013 | Krampotich et al. |
| 8,465,317 B2 | 6/2013 | Giniadek et al. |
| 8,506,174 B2 | 8/2013 | Nakagawa |
| 8,556,645 B2 | 10/2013 | Crain |
| 8,559,785 B2 | 10/2013 | Barlowe et al. |
| 8,600,208 B2 | 12/2013 | Badar et al. |
| 8,639,081 B2 | 1/2014 | Barnes et al. |
| 8,655,136 B2 | 2/2014 | Trebesch et al. |
| 8,690,593 B2 | 4/2014 | Anderson et al. |
| 8,764,308 B2 | 7/2014 | Irwin et al. |
| 8,864,390 B2 | 10/2014 | Chen et al. |
| 8,870,466 B2 | 10/2014 | Lu |
| 8,876,403 B2 | 11/2014 | Katoh |
| 8,979,569 B2 | 3/2015 | Aekins |
| 9,075,203 B2 | 7/2015 | Holmberg |
| 9,223,094 B2 | 12/2015 | Schneider et al. |
| 9,429,714 B2 | 8/2016 | Holmberg |
| 9,488,788 B2 | 11/2016 | Murray et al. |
| 9,535,229 B2 | 1/2017 | Ott et al. |
| 9,557,495 B2 | 1/2017 | Raven et al. |
| 9,570,852 B2 | 2/2017 | Plamondon et al. |
| 9,747,141 B2 | 8/2017 | Caunter et al. |
| 10,067,301 B2 | 9/2018 | Murray et al. |
| 10,247,887 B2 | 4/2019 | Holmberg |
| 10,545,296 B2 | 1/2020 | Murray et al. |
| 2001/0001270 A1 | 5/2001 | Williams Vigliaturo |
| 2002/0028055 A1 | 3/2002 | Shibutani et al. |
| 2002/0090177 A1 | 7/2002 | Anderson |
| 2002/0166226 A1 | 11/2002 | Matsuura |
| 2002/0181922 A1 | 12/2002 | Xin et al. |
| 2003/0002808 A1 | 1/2003 | Lampert et al. |
| 2003/0007767 A1 | 1/2003 | Douglas et al. |
| 2003/0017729 A1 | 1/2003 | Huang |
| 2003/0128951 A1 | 7/2003 | Lecomte et al. |
| 2003/0165315 A1 | 9/2003 | Trebesch et al. |
| 2003/0174996 A1 | 9/2003 | Henschel et al. |
| 2003/0190035 A1 | 10/2003 | Knudsen et al. |
| 2003/0220008 A1 | 11/2003 | Viklund et al. |
| 2003/0220080 A1 | 11/2003 | Chuberre et al. |
| 2003/0220081 A1 | 11/2003 | Dykstra et al. |
| 2003/0220082 A1 | 11/2003 | Yoshida |
| 2003/0220083 A1 | 11/2003 | Lee et al. |
| 2003/0220084 A1 | 11/2003 | Makarov et al. |
| 2003/0220085 A1 | 11/2003 | Kawand |
| 2003/0220086 A1 | 11/2003 | Birkett |
| 2003/0220087 A1 | 11/2003 | Suhonen |
| 2003/0220088 A1 | 11/2003 | Cowley et al. |
| 2003/0220089 A1 | 11/2003 | Change et al. |
| 2003/0222008 A1 | 12/2003 | Nightlinger et al. |
| 2004/0011750 A1 | 1/2004 | Kim et al. |
| 2004/0013390 A1 | 1/2004 | Kim et al. |
| 2004/0136676 A1 | 7/2004 | Mertesdorf |
| 2004/0175090 A1 | 9/2004 | Vastmans et al. |
| 2004/0247252 A1 | 12/2004 | Ehrenreigh |
| 2004/0258384 A1 | 12/2004 | Frebesch et al. |
| 2005/0025444 A1 | 2/2005 | Barnes et al. |
| 2005/0054230 A1 | 3/2005 | Huang |
| 2005/0058404 A1 | 3/2005 | Ngo |
| 2005/0058421 A1 | 3/2005 | Dagley et al. |
| 2005/0078929 A1 | 4/2005 | Iwanek |
| 2005/0100301 A1 | 5/2005 | Solheid et al. |
| 2005/0123261 A1 | 6/2005 | Bellekens et al. |
| 2005/0124201 A1 | 6/2005 | Lo et al. |
| 2006/0049826 A1 | 3/2006 | Daneman et al. |
| 2006/0089039 A1 | 4/2006 | Caveney |
| 2006/0275008 A1 | 12/2006 | Xin |
| 2006/0276071 A1 | 12/2006 | Rossi |
| 2007/0003204 A1 | 1/2007 | Makrides-Saravanos et al. |
| 2007/0025675 A1 | 2/2007 | Kramer |
| 2007/0031099 A1 | 2/2007 | Herzog et al. |
| 2007/0036503 A1 | 2/2007 | Solheid et al. |
| 2007/0049082 A1 | 3/2007 | Wu |
| 2007/0077806 A1 | 4/2007 | Martin et al. |
| 2007/0140621 A1 | 6/2007 | Decusatis et al. |
| 2007/0201806 A1 | 8/2007 | Douglas et al. |
| 2007/0232118 A1 | 10/2007 | Wu |
| 2007/0298636 A1 | 12/2007 | Kusada et al. |
| 2008/0030220 A1 | 2/2008 | Agarwal et al. |
| 2008/0175550 A1 | 7/2008 | Coburn et al. |
| 2008/0226237 A1 | 9/2008 | O'Riorden et al. |
| 2009/0042424 A1 | 2/2009 | Kaneda |
| 2009/0047800 A1* | 2/2009 | Tabet .................. G02B 6/3897 439/32 |
| 2009/0047818 A1 | 2/2009 | Irwin et al. |
| 2009/0067800 A1 | 3/2009 | Vazquez et al. |
| 2009/0067802 A1 | 3/2009 | Hoehne et al. |
| 2009/0097813 A1 | 4/2009 | Hill |
| 2009/0214171 A1 | 8/2009 | Coburn et al. |
| 2009/0226142 A1 | 9/2009 | Barnes et al. |
| 2009/0245732 A1 | 10/2009 | Murano |
| 2009/0245743 A1 | 10/2009 | Cote et al. |
| 2009/0274431 A1 | 11/2009 | Krampotich et al. |
| 2010/0142910 A1 | 6/2010 | Hill et al. |
| 2010/0158465 A1 | 6/2010 | Smrha |
| 2010/0216325 A1 | 8/2010 | Huang |
| 2010/0220961 A1 | 9/2010 | De Jong et al. |
| 2010/0266253 A1 | 10/2010 | Krampotich et al. |
| 2010/0316346 A1 | 12/2010 | Krampotich et al. |

(56) References Cited

U.S. PATENT DOCUMENTS

| | | |
|---|---|---|
| 2010/0322578 A1 | 12/2010 | Cooke et al. |
| 2011/0058773 A1 | 3/2011 | Peterhans et al. |
| 2011/0081113 A1 | 4/2011 | Jones |
| 2011/0091159 A1 | 4/2011 | De Jong et al. |
| 2011/0183541 A1 | 7/2011 | Kosugi |
| 2011/0188809 A1 | 8/2011 | LeBlanc et al. |
| 2011/0211799 A1 | 9/2011 | Conner et al. |
| 2011/0217008 A1 | 9/2011 | Cline et al. |
| 2011/0217016 A1 | 9/2011 | Mullsteff |
| 2011/0235979 A1 | 9/2011 | Anderson et al. |
| 2011/0262077 A1 | 10/2011 | Anderson et al. |
| 2011/0267794 A1 | 11/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0286712 A1 | 11/2011 | Puetz et al. |
| 2011/0299814 A1 | 12/2011 | Nakagawa |
| 2011/0317974 A1 | 12/2011 | Krampotich et al. |
| 2012/0051708 A1 | 3/2012 | Badar et al. |
| 2012/0057826 A1 | 3/2012 | Katoh |
| 2012/0057838 A1 | 3/2012 | Hill et al. |
| 2012/0155810 A1 | 6/2012 | Nakagawa |
| 2012/0208388 A1 | 8/2012 | Kosugi |
| 2012/0213478 A1 | 8/2012 | Chen et al. |
| 2012/0308183 A1 | 12/2012 | Irwin et al. |
| 2012/0321267 A1 | 12/2012 | Coburn et al. |
| 2013/0089292 A1 | 4/2013 | Ott et al. |
| 2013/0089298 A1 | 4/2013 | Holmberg et al. |
| 2013/0115794 A1 | 5/2013 | Chang et al. |
| 2013/0163934 A1 | 6/2013 | Lee et al. |
| 2013/0183018 A1 | 7/2013 | Holmberg |
| 2013/0259429 A1 | 10/2013 | Czosnowski et al. |
| 2013/0287356 A1 | 10/2013 | Solheid et al. |
| 2013/0301994 A1 | 11/2013 | Motofuji |
| 2013/0323949 A1 | 12/2013 | De Dios Martin et al. |
| 2014/0086545 A1 | 3/2014 | Solheid et al. |
| 2014/0133819 A1 | 5/2014 | Trebesch et al. |
| 2014/0141641 A1 | 5/2014 | De Dios Martin et al. |
| 2014/0169727 A1 | 6/2014 | Veatch et al. |
| 2015/0241650 A1 | 8/2015 | Travis |
| 2015/0331215 A1 | 11/2015 | Smrha et al. |
| 2016/0116685 A1 | 4/2016 | Wong et al. |
| 2016/0356962 A1 | 12/2016 | Moriyama et al. |
| 2017/0031109 A1 | 2/2017 | Meadowcroft et al. |

FOREIGN PATENT DOCUMENTS

| | | |
|---|---|---|
| CN | 2513249 Y | 9/2002 |
| CN | 1531663 A | 9/2004 |
| CN | 1658441 A | 8/2005 |
| CN | 1770568 A | 5/2006 |
| CN | 101065888 A | 10/2007 |
| CN | 101133524 A | 2/2008 |
| CN | 101160696 A | 4/2008 |
| CN | 101208625 A | 6/2008 |
| CN | 101238400 A | 8/2008 |
| CN | 101313441 A | 11/2008 |
| CN | 101650457 A | 2/2010 |
| CN | 102365568 A | 2/2012 |
| CN | 103091793 A | 5/2013 |
| DE | 27 35 1 06 A1 | 2/1979 |
| DE | 29 1 8 309 A1 | 11/1980 |
| DE | 33 08 682 A1 | 9/1984 |
| DE | 38 36 273 A1 | 4/1990 |
| DE | 44 13 136 C1 | 5/1995 |
| DE | 29504191 U1 | 3/1996 |
| EP | 0 146 478 A2 | 6/1985 |
| EP | 0 149 250 A2 | 7/1985 |
| EP | 0 356 942 A2 | 3/1990 |
| EP | 0 406 151 A2 | 1/1991 |
| EP | 0 464 570 A1 | 1/1992 |
| EP | 0 479 226 A1 | 4/1992 |
| EP | 0 196 102 B1 | 3/1993 |
| EP | 0 538 164 A1 | 4/1993 |
| EP | 0 563 995 B1 | 10/1999 |
| EP | 2 337 163 A1 | 6/2001 |
| EP | 1 271 706 A2 | 1/2003 |
| EP | 1 653 566 A1 | 5/2006 |
| EP | 1 855 360 A1 | 11/2007 |
| EP | 2 063 497 A1 | 5/2009 |
| EP | 2 144 100 A1 | 1/2010 |
| FR | 2 531 576 A1 | 2/1984 |
| FR | 2 587 127 A1 | 3/1987 |
| FR | 2 678 076 A1 | 12/1992 |
| JP | S59-74523 A | 4/1984 |
| JP | S60-169811 A | 9/1985 |
| JP | S61-55607 A | 3/1986 |
| JP | S61-90104 A | 5/1986 |
| JP | S63-184271 A | 7/1988 |
| JP | 2002-082256 A | 3/2002 |
| JP | 2003-224373 A | 8/2003 |
| JP | 2003-526116 A | 9/2003 |
| KR | 20-0337929 Y1 | 1/2004 |
| KR | 10-2008-0033420 A | 4/2008 |
| WO | 91/10927 A1 | 7/1991 |
| WO | 95/07480 A1 | 3/1995 |
| WO | 96/10203 A1 | 4/1996 |
| WO | 99/00619 A1 | 1/1999 |
| WO | 03/005095 A2 | 1/2003 |
| WO | 2004/065999 A2 | 8/2004 |
| WO | 2005/041363 A1 | 5/2005 |
| WO | 2006/047258 A1 | 5/2006 |
| WO | 2007021533 A2 | 2/2007 |
| WO | 2007/044310 A1 | 4/2007 |
| WO | 2009/135787 A1 | 11/2009 |
| WO | 2010/038283 A1 | 4/2010 |
| WO | 2012/054174 A1 | 4/2012 |
| WO | 2012/107439 A1 | 8/2012 |
| WO | 2012/107441 A1 | 8/2012 |
| WO | 2012/151175 A2 | 11/2012 |
| WO | 2013/109469 A1 | 7/2013 |
| WO | 2013/124785 A1 | 8/2013 |
| WO | 2015/103783 A1 | 7/2015 |

OTHER PUBLICATIONS

Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

"ITU Fiber Handbook" with English translation, 14 pages, Mar. 1992.

Northern Telecom Bulletin #91-004, Issue #2, May 1991.

AT&T Product Bulletin 2987D-DLH-7/89, "High Density Interconnect System (HDIC)," Issue 2 (Copyright 1989).

Preface to the book "Structure, Installation, Connection and Protection of Communication Optical Fiber Cable," in Chinese with English Translation, 14 pages (Mar. 1992).

Complaint relating to Civil Action No. 5:11-cv-02509-JS, *ADC Telecommunications, Inc* v. *Opterna Am, Inc.* filed Apr. 11, 2011 (14 pages).

Complaint relating to Civil Action No. 1:11cv-735 (GBL-IDD), *ADC Telecommunications, Inc* v. *Opterna Am, Inc.* filed Jul. 12, 2011 (5 pages).

Plaintiff's Notice of Dismissal relating to Civil Action No. 5:11-cv-02509-JS, *ADC Telecommunications, Inc* v. *Opterna Am, Inc.* filed Jul. 12, 2011 (1 page).

\* cited by examiner

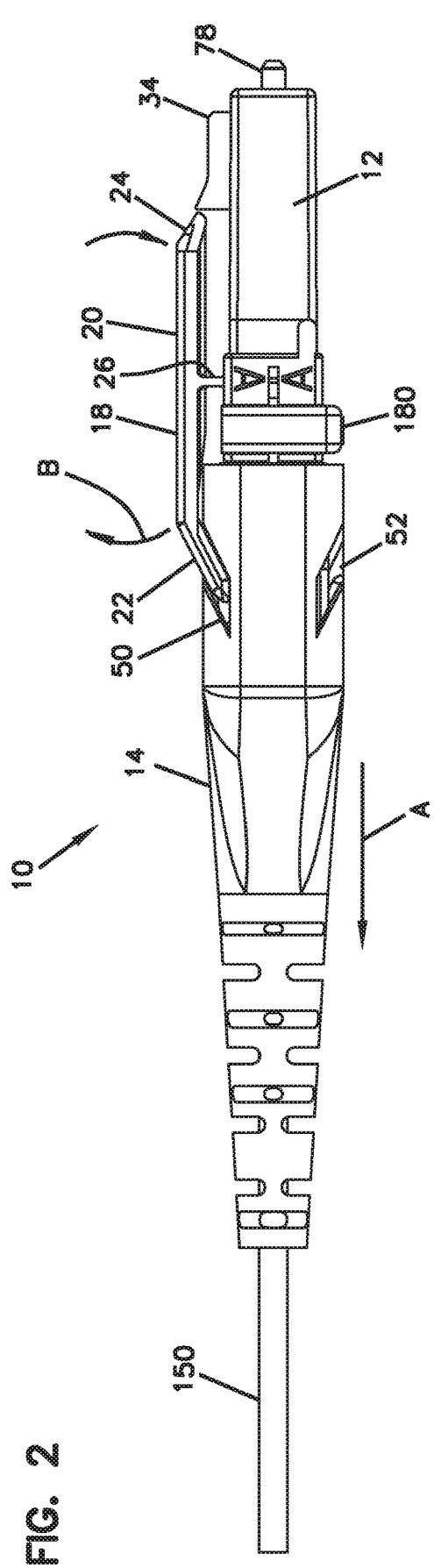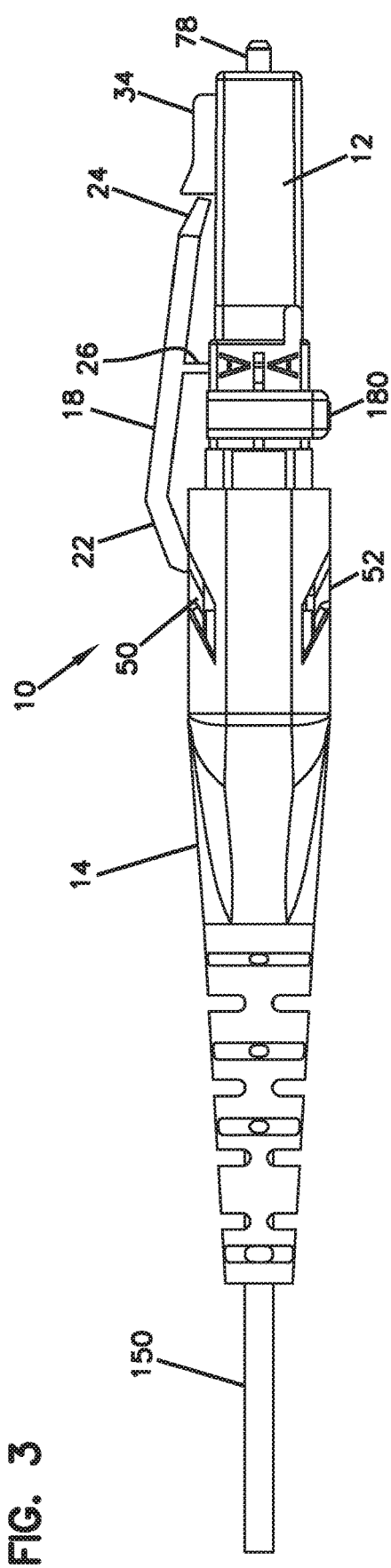

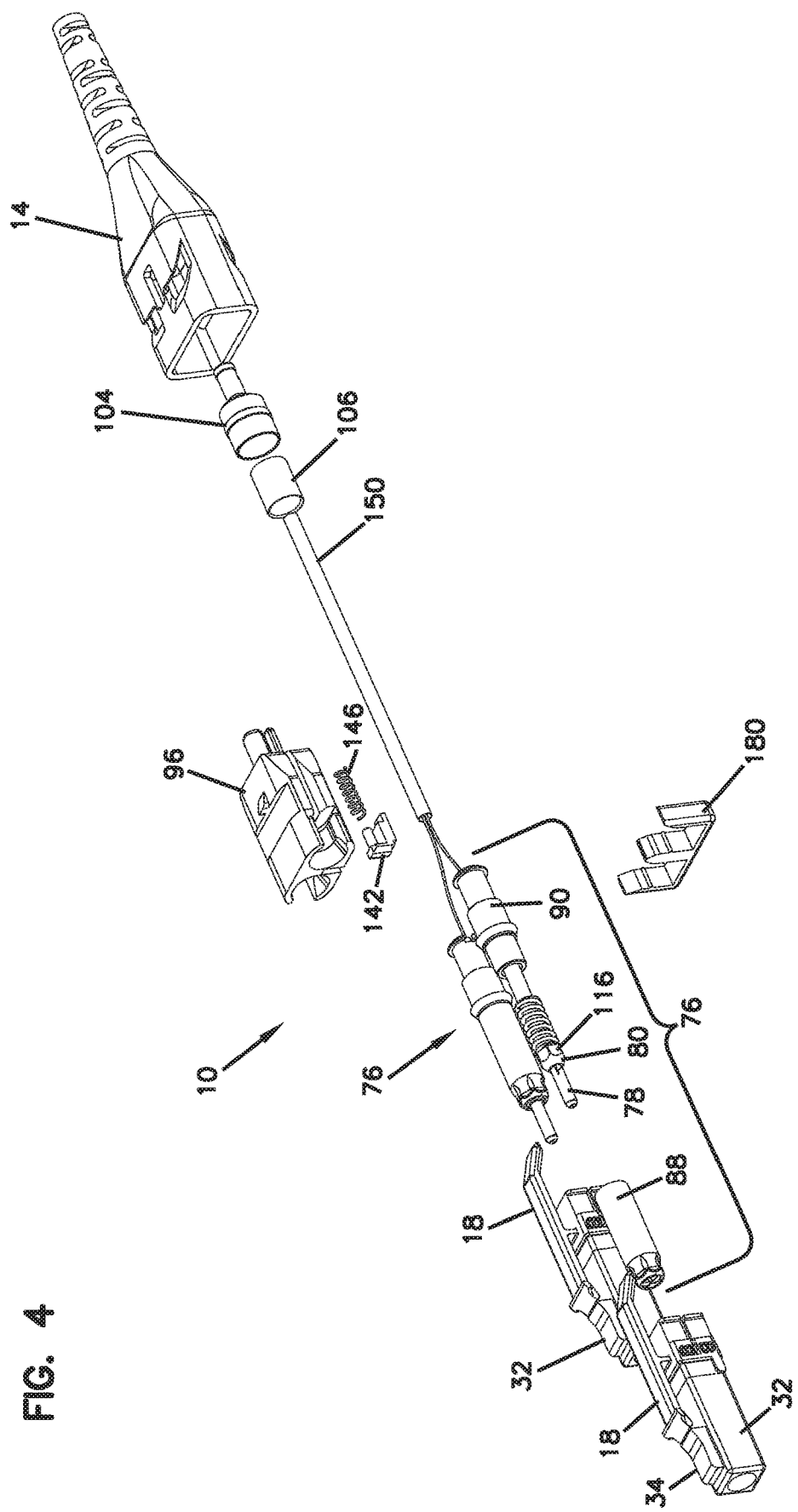

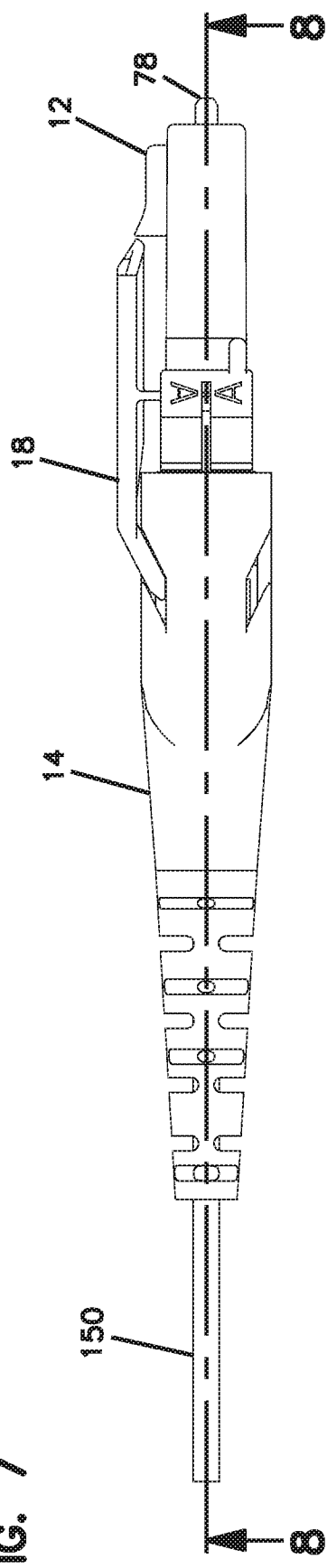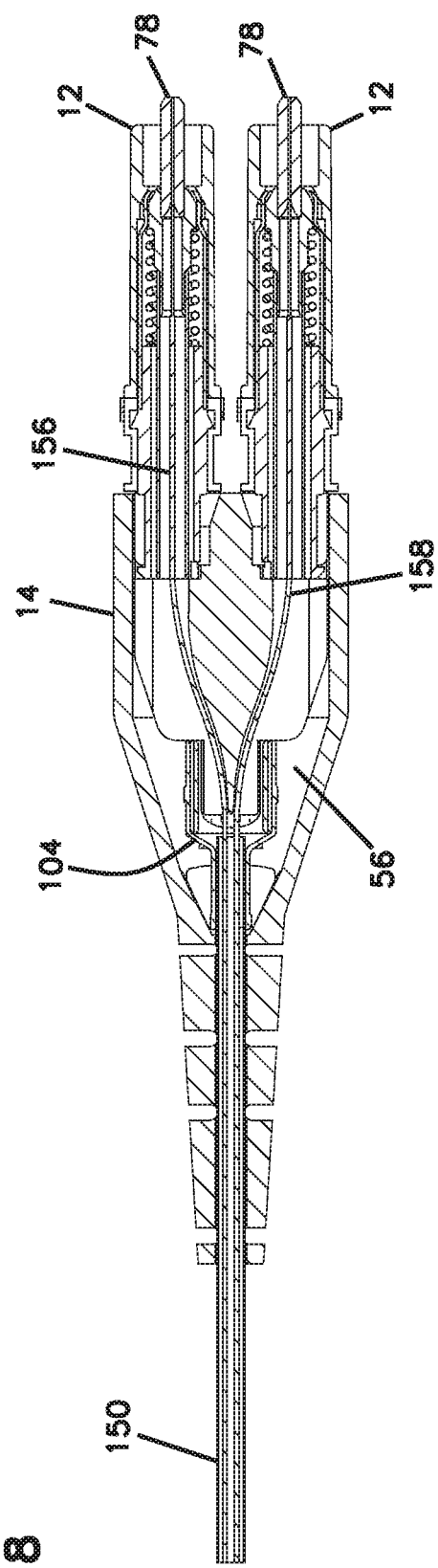

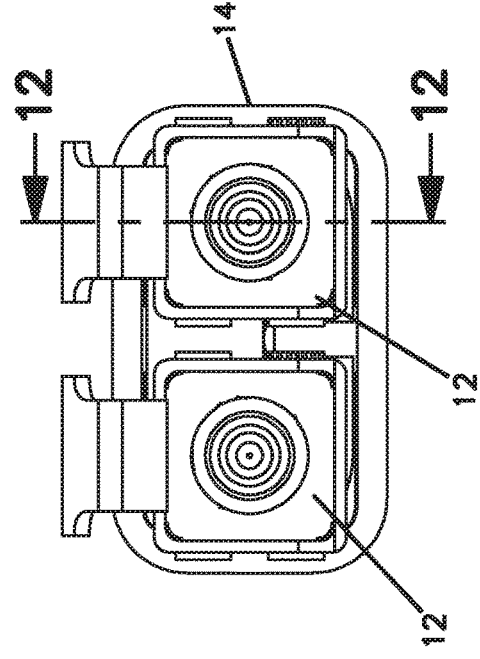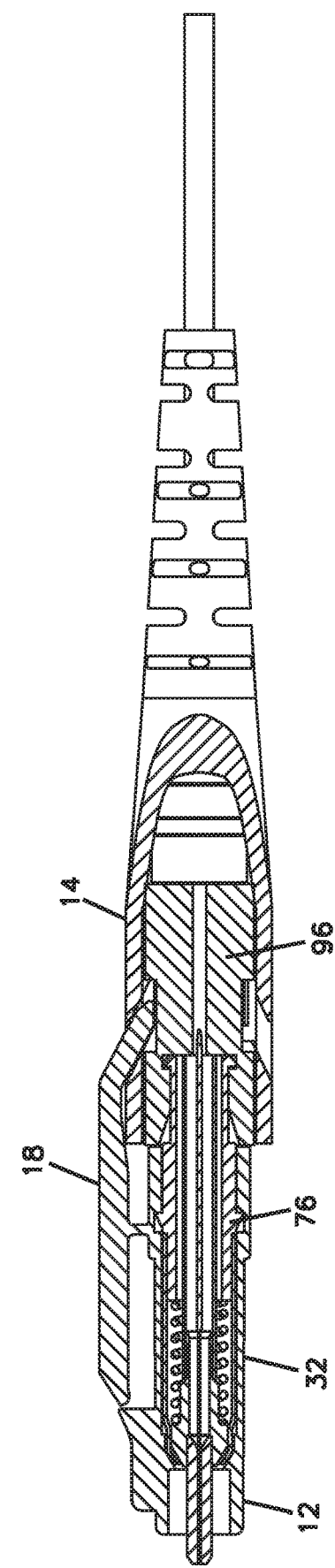
FIG. 11
FIG. 12

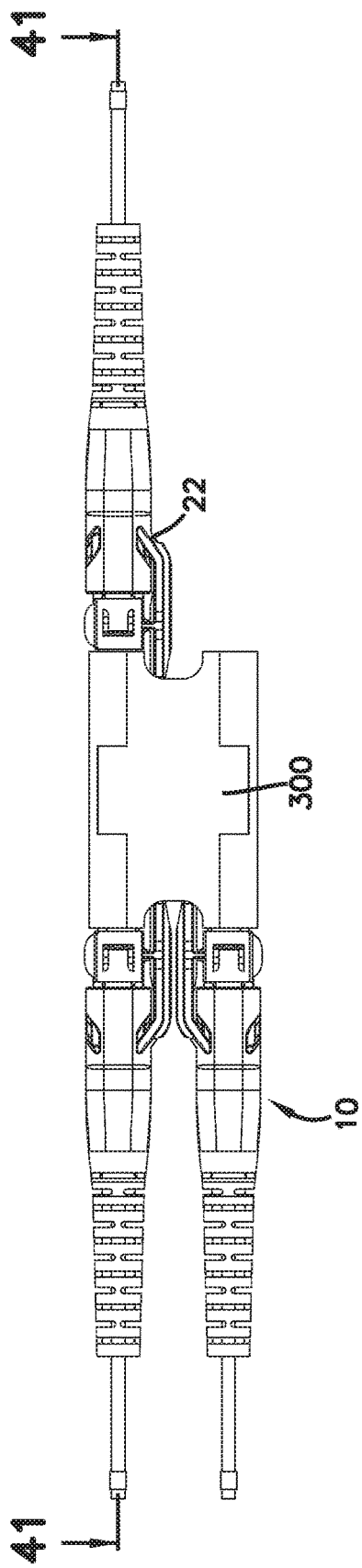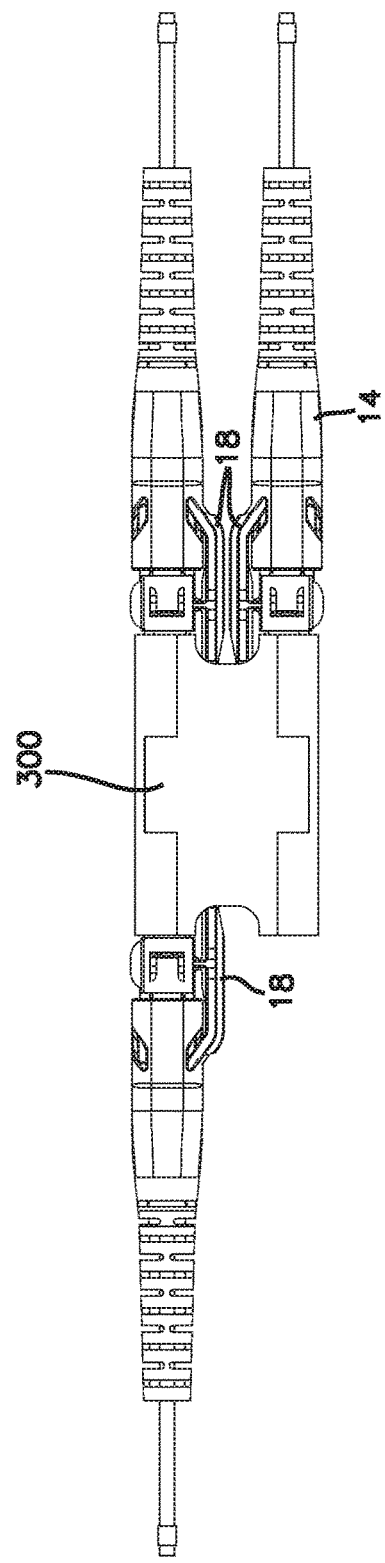
FIG. 39
FIG. 40

FIBER OPTIC ADAPTER AND CASSETTE

CROSS-REFERENCE TO RELATED APPLICATION

This application is a National Stage Application of PCT/US2018/036466, filed on Jun. 7, 2018, which claims the benefit of U.S. Patent Application Ser. No. 62/516,201, filed on Jun. 7, 2017, the disclosures of which are incorporated herein by reference in their entireties. To the extent appropriate, a claim of priority is made to each of the above disclosed applications.

BACKGROUND

Modern optical devices and optical communications systems widely use fiber optic cables. A typical fiber optic cable includes one or more optical fibers contained within a protective jacket. Reinforcing structures such as aramid yarns and/or fiber reinforced epoxy rods can be used to provide reinforcement to the optical cables. It is well understood that a typical optical fiber includes a glass fiber processed so that light beams transmitted through the glass fiber are subject to total internal reflection wherein a large fraction of the incident intensity of light directed into the fiber is received at the other end of the fiber. A typical optical fiber includes a glass core surrounded by a cladding layer having a lower refractive index as compared to the refractive index of the core. The cladding causes light to be confined to the core by total internal reflection at the boundary between the two. The cladding layer of an optical fiber is often covered by one or more polymeric coatings (e.g., acrylate) to protect the glass and to facilitate handling of the optical fiber.

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a fusion splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule assembly includes a ferrule that functions to support an end portion of at least one optical fiber (in the case of a multi-fiber ferrule, the ends of multiple fibers are supported). The ferrule has a distal end face at which a polished end of the optical fiber is located. When two optical fibers are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter including an alignment sleeve that receives and coaxially aligns the ferrules of the fiber optic connectors desired to be interconnected. For certain styles of fiber optic connectors, the optical fibers are secured within their respective ferrules by a potting material such as epoxy.

SUMMARY

One aspect of the invention concerns a connector including two connector portions each including a ferrule and a latch, each latch including a distal end, and a proximal end, wherein the latch is pivotable about an intermediate connection portion; and a boot mounted to the connector portions, the boot movable longitudinally relative to the connector portions, wherein the boot causes the distal ends of the latch to pivot toward the ferrule of each connector portion as the boot is moved away from the connector portions.

In another aspect of the invention, front housings of the connector portions can each be rotated about the longitudinal axis of the ferrule without rotating the ferrule or the boot, to change the polarity of the two connector portions.

In a further aspect of the invention, the spacing between the two ferrules is adjustable.

In one example, a holder holds the connector portions, the holder including side slots, the connector portions inserted laterally into the side slots. The holder defines an area for receipt of a fiber optic cable when the ferrule is pushed in a direction toward the boot.

In one example, a ferrule assembly includes a ferrule, a hub, and a spring. The ferrule assembly includes a front sleeve and a rear sleeve which together hold the ferrule, hub, and spring.

In a further example, a connector includes (a) two connector portions each including a ferrule assembly including a ferrule and a hub mounted together, and a spring, the ferrule assembly including a front sleeve and a rear sleeve, the front and rear sleeves mounted together with the ferrule end protruding and the spring located in an interior area biasing the ferrule toward an extended position; a front housing mounted to the ferrule assembly and including a latch, each latch including a distal end and a proximal end, wherein the latch is pivotable about an intermediate connection portion, wherein the distal end includes a shoulder for mating with a latching shoulder of an adapter; (b) a holder for holding the connector portions, the holder including side slots, the connector portions mounted to the holder by moving laterally to the side slots, the holder including a rearwardly projecting crimp support; and (c) a boot mounted to the connector portions, the boot movable longitudinally relative to the connector portions, wherein the boot causes the distal ends of the latch to pivot toward the ferrule of each connector portion as the boot is moved away from the connector portions.

In one example, a clip holds the two connector portions at the desired spacing. The clip can be used to position the connector portions at one of at least two different spacings.

According to another example of the disclosure, a dual-layered fiber optic adapter block configured for mating the above-discussed connectors may be provided. The fiber optic adapter block may include at least one upper receptacle, at least one lower receptacle vertically aligned with the upper receptacle to form a column of receptacles, and a center divider that divides the at least one upper receptacle from the at least one lower receptacle, the center divider defining latching shoulders for mating with latches of both a connector to be mounted at the upper receptacle and the lower receptacle of the column, wherein the adapter block is configured to orient the fiber optic connectors latched to the upper and lower receptacles of the column such that latches of the fiber optic connectors face each other, and wherein the column defines a total height of less than about 0.875 inches.

According to another inventive aspect, the disclosure is directed to a fiber optic cassette comprising a cassette body defining a front end, a rear end, an interior for routing fibers therein, a connection panel at the front end, wherein the connection panel defines a plurality of upper receptacles, a plurality of lower receptacles vertically aligned with the upper receptacles to form columns of receptacles, and a center divider that divides the upper receptacles from the lower receptacles, the center divider defining latching shoulders for mating with latches of both a connector to be mounted at an upper receptacle of a given column and the lower receptacle of the given column, wherein the connection panel is configured to orient the fiber optic connectors latched to the upper and lower receptacles of each column such that latches of the fiber optic connectors face each other, and wherein the connection panel of the fiber optic cassette defines a total height of less than about 0.875 inches, the rear end of the cassette body including connector ports for receiving multi-fiber connectors carrying fibers to be relayed to the front panel with terminated connectors.

According to further inventive aspects, the disclosure is directed to a fiber optic connector port arrangement, the connector port arrangement comprising at least one upper receptacle and at least one lower receptacle vertically aligned with the upper receptacle to form a column of receptacles, the column including a center divider that divides the at least one upper receptacle from the at least one lower receptacle, the center divider defining latching shoulders for mating with latches of both a connector to be mounted at the upper receptacle of the column and the lower receptacle of the column.

According to further inventive aspects, the disclosure is directed to a fiber optic connector port arrangement, the connector port arrangement comprising at least one upper receptacle and at least one lower receptacle vertically aligned with the upper receptacle to form a column of receptacles, wherein the connector port arrangement is configured to orient the fiber optic connectors latched to the upper and lower receptacles of the column such that latches of the fiber optic connectors face each other.

According to yet further inventive aspects, the disclosure is directed to a dual-layered fiber optic connector port arrangement comprising at least one upper receptacle and at least one lower receptacle vertically aligned with the upper receptacle to form a column of receptacles, wherein the column defines a total height of less than about 0.875 inches.

BRIEF DESCRIPTION OF THE DRAWINGS

FIG. 2 is a side view of the connector of FIG. 1 shown in the latched position;

FIG. 3 is a side view of the connector of FIG. 1 shown in the unlatched position;

FIG. 4 is an exploded perspective view of the connector of FIG. 1;

FIG. 7 is a side view of the connector of FIG. 1;

FIG. 8 is a cross-sectional view of the connector of FIG. 7 taken along line 8-8;

FIG. 11 is an end view of the connector of FIG. 1;

FIG. 12 is a cross-sectional view of the connector of FIG. 11, taken along line 12-12;

FIG. 39 is a right side view of the adapter block of FIG. 28;

FIG. 40 is a left side view of the adapter block of FIG. 28;

DETAILED DESCRIPTION

Figure 1:
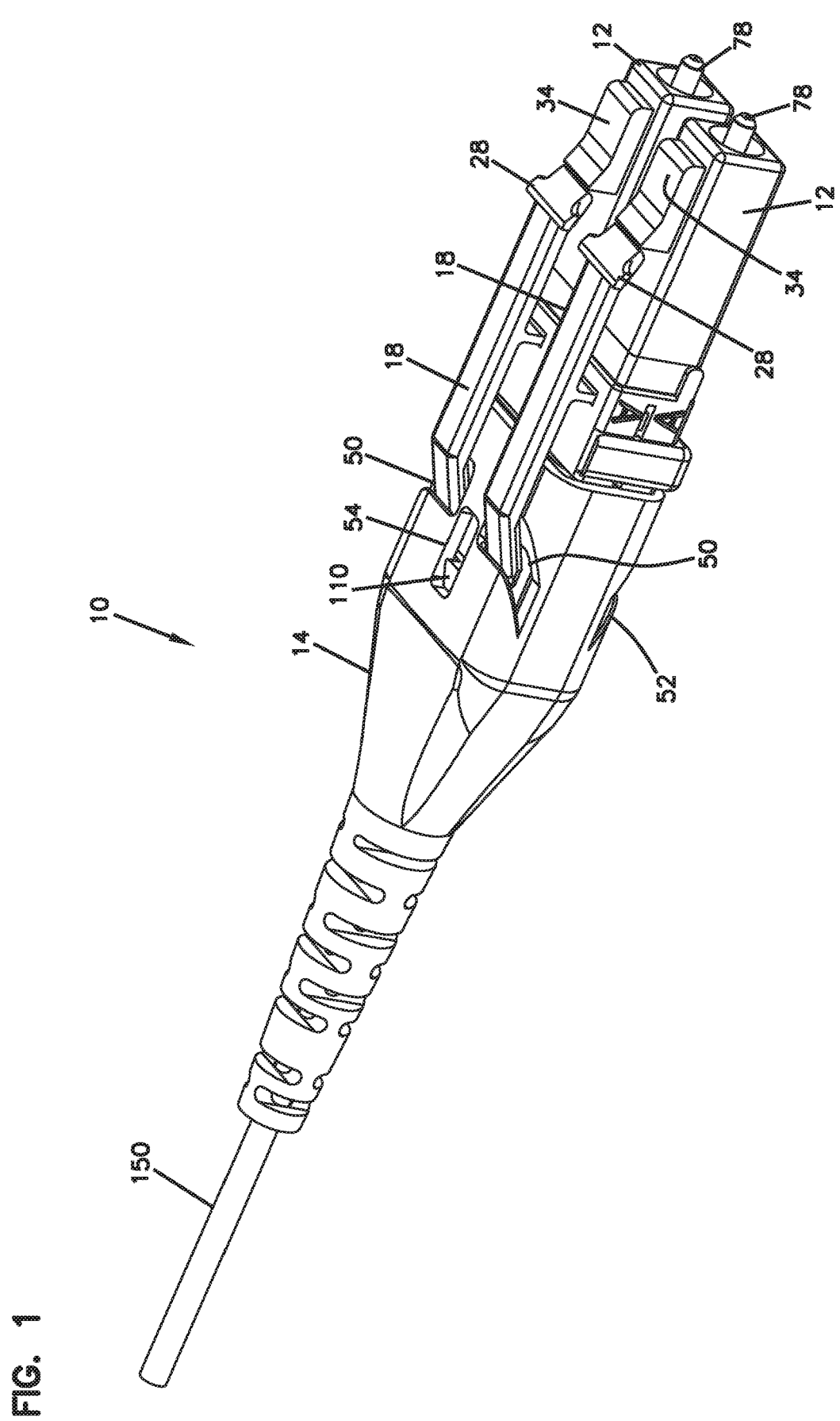
FIG. 1 is a perspective view of one example fiber optic connector in accordance with aspects of the present invention.
Figure 5:
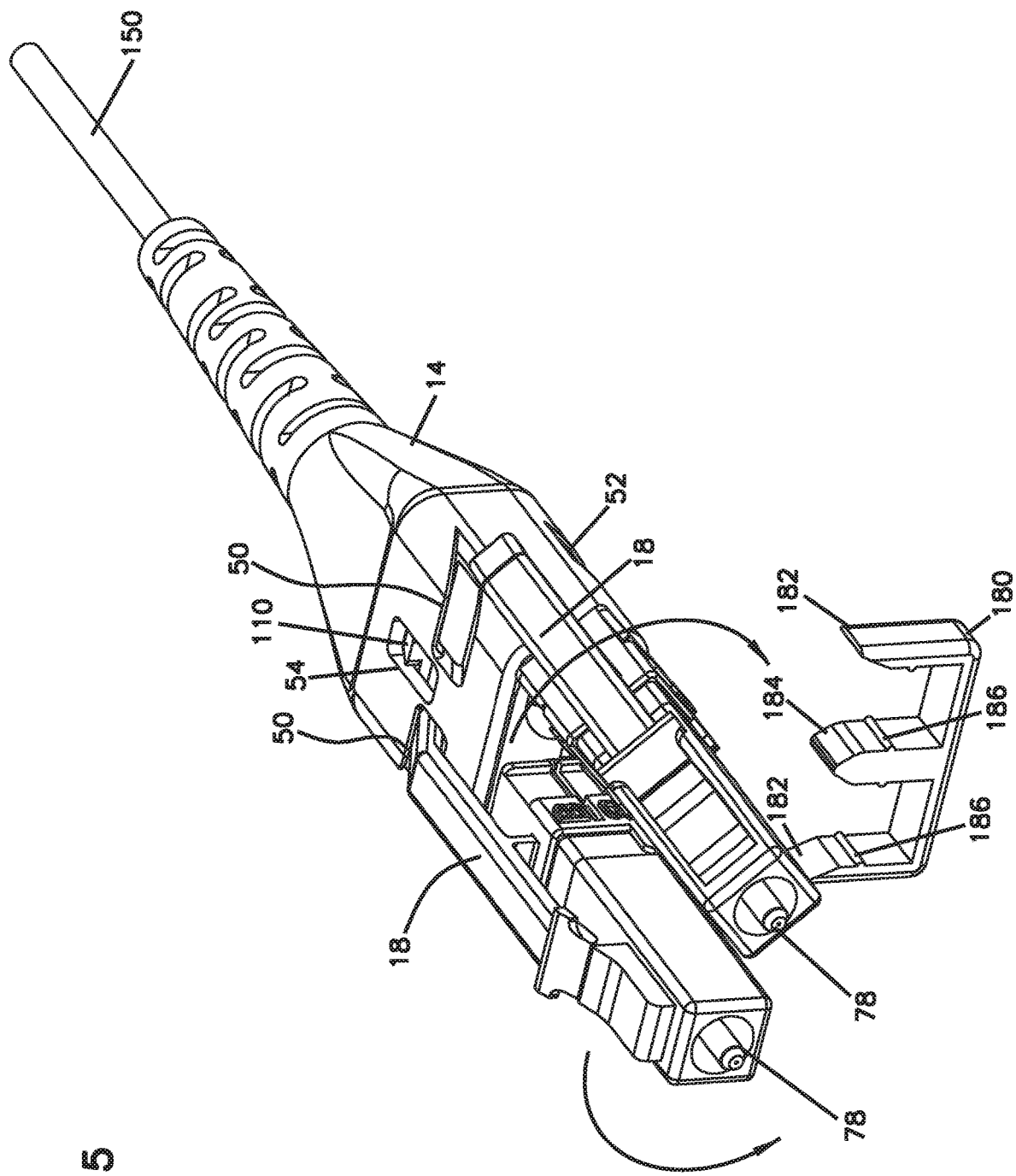
FIG. 5 is a perspective view of the connector, showing the front housings of the connector portions being rotated to change the polarity of the connector.
Figure 6:
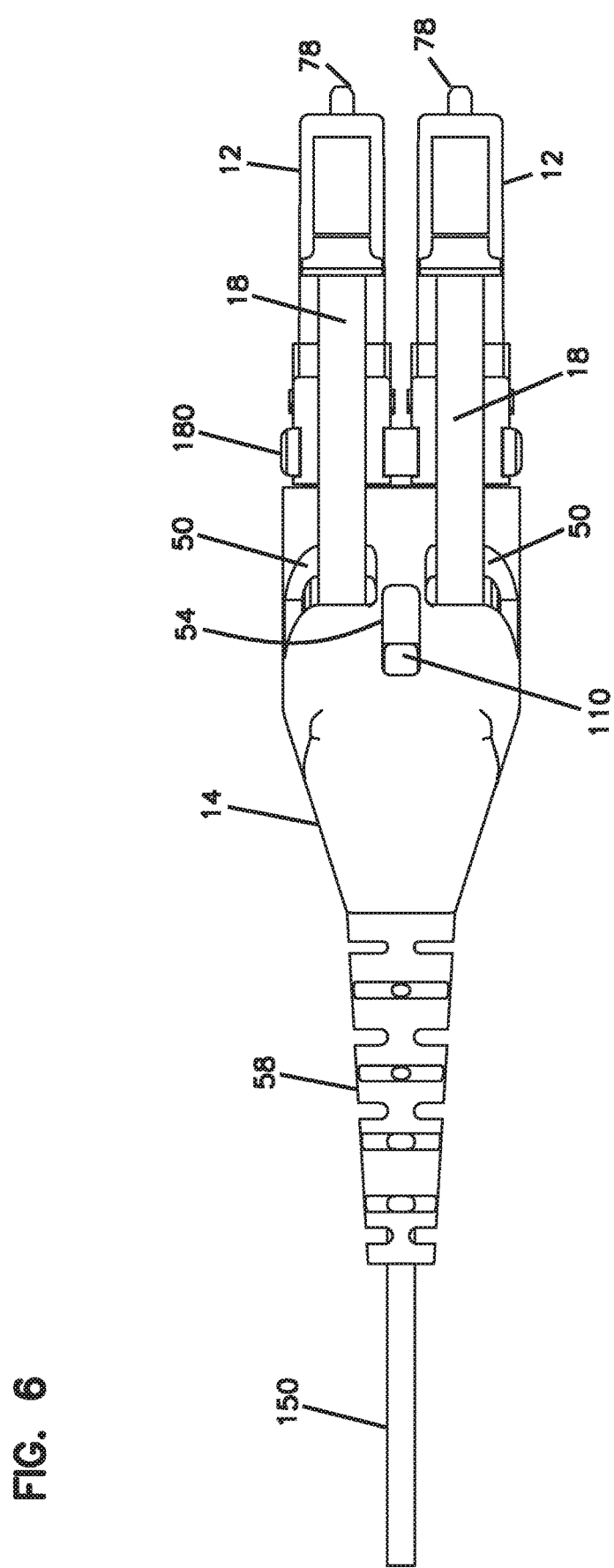
FIG. 6 is a top view of the connector of FIG. 1.
Figure 9:
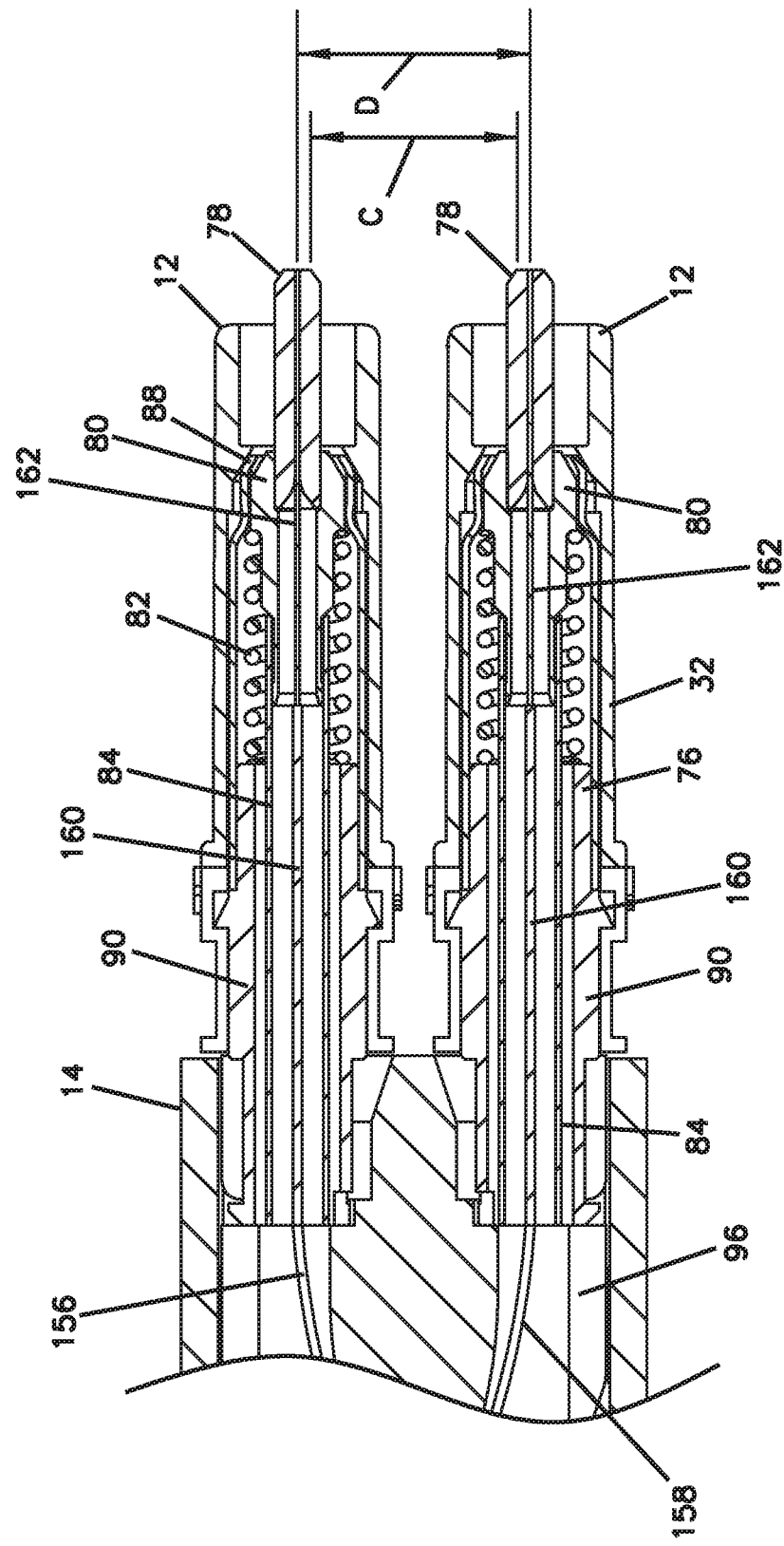
FIG. 9 is an enlarged view of a front portion of the connector of FIG. 8.
Figure 10:
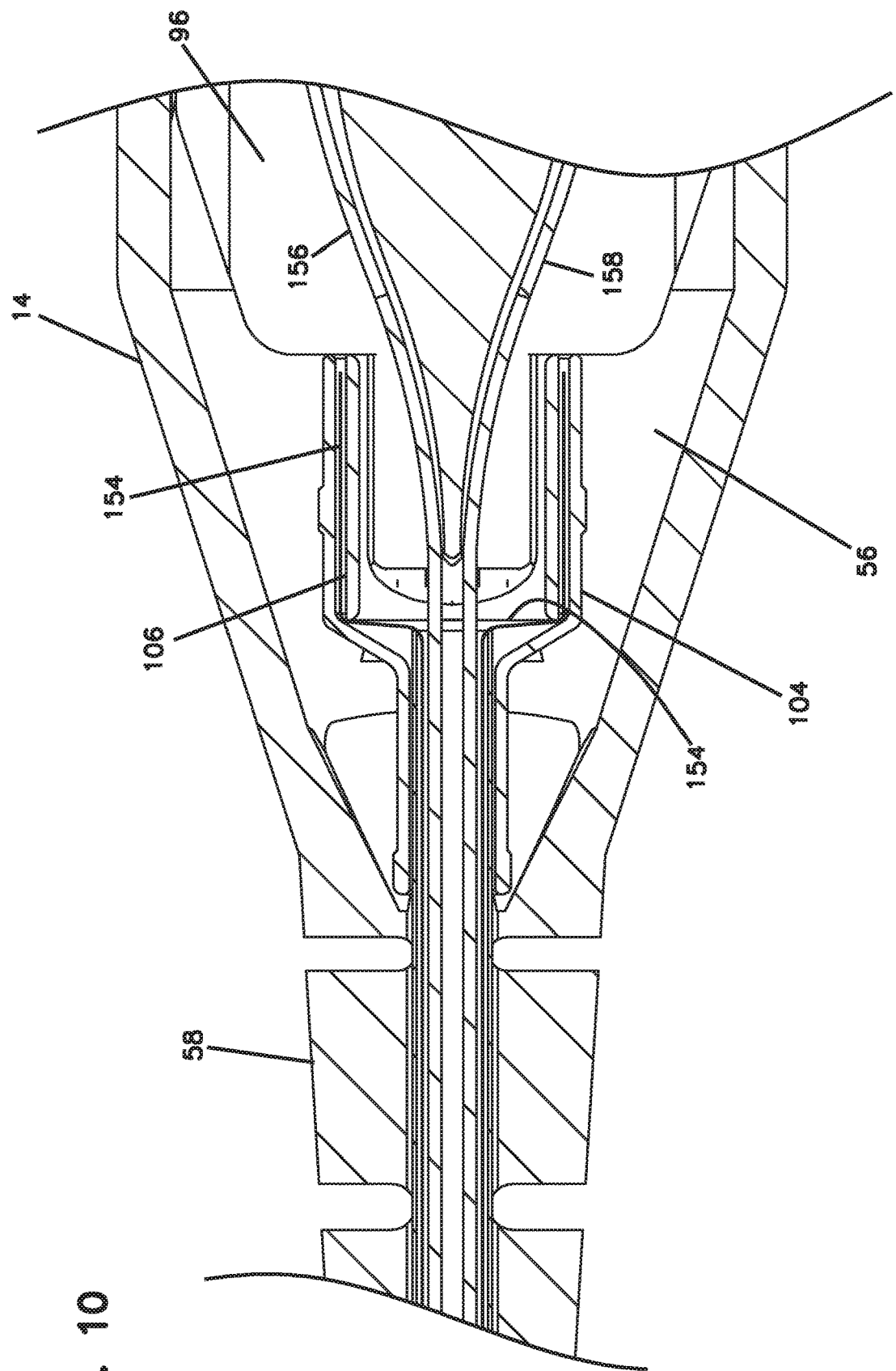
FIG. 10 is an enlarged view of an intermediate portion of the connector of FIG. 8.
Figure 13:
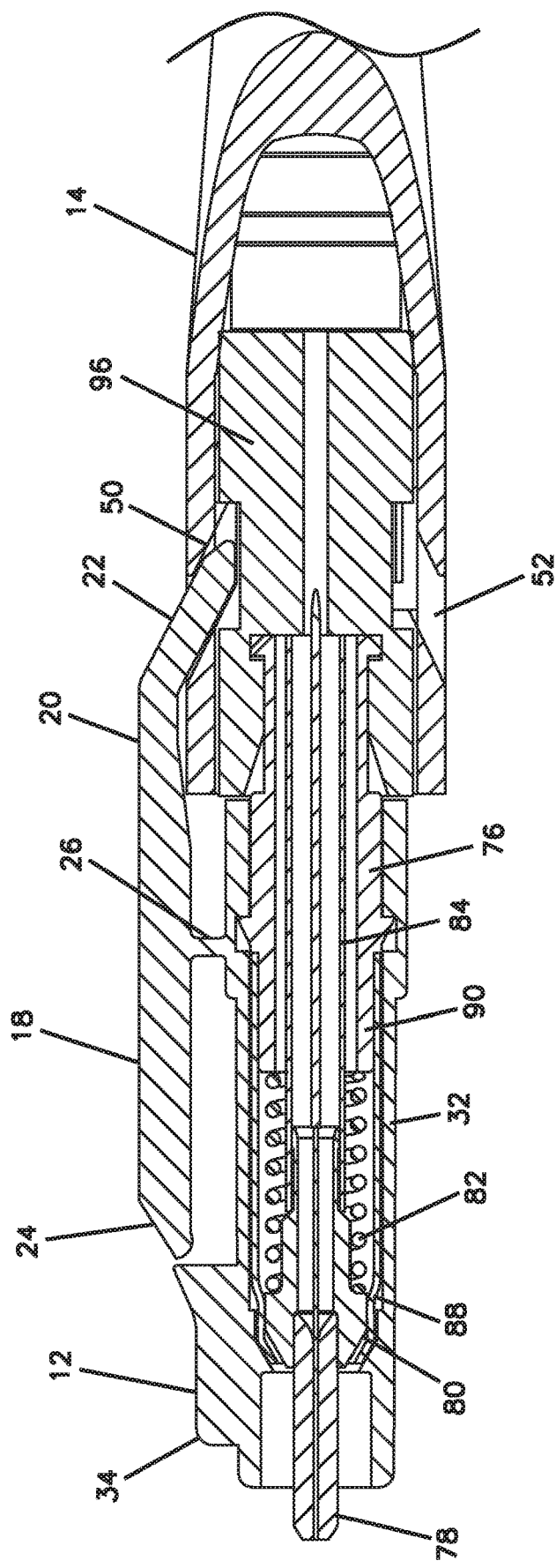
FIG. 13 is an enlarged view of a front portion of the connector of FIG. 12.
Figure 14:
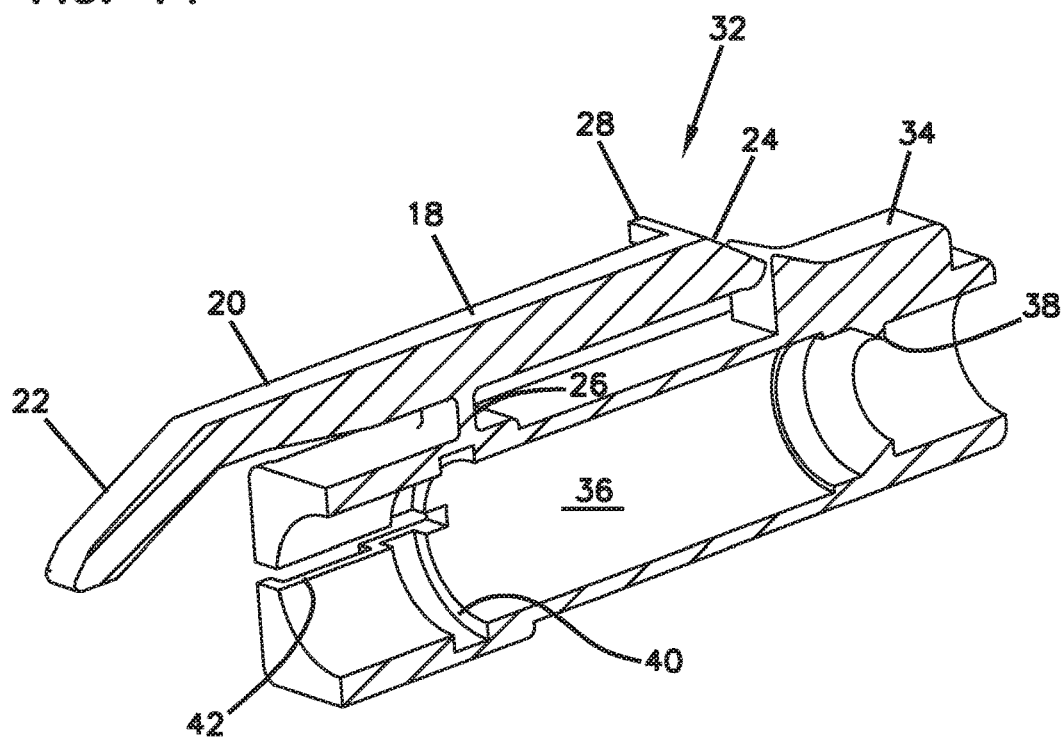
FIG. 14 is a rear perspective view in cross-section of the front housing of one of the connector portions.
Figure 15:
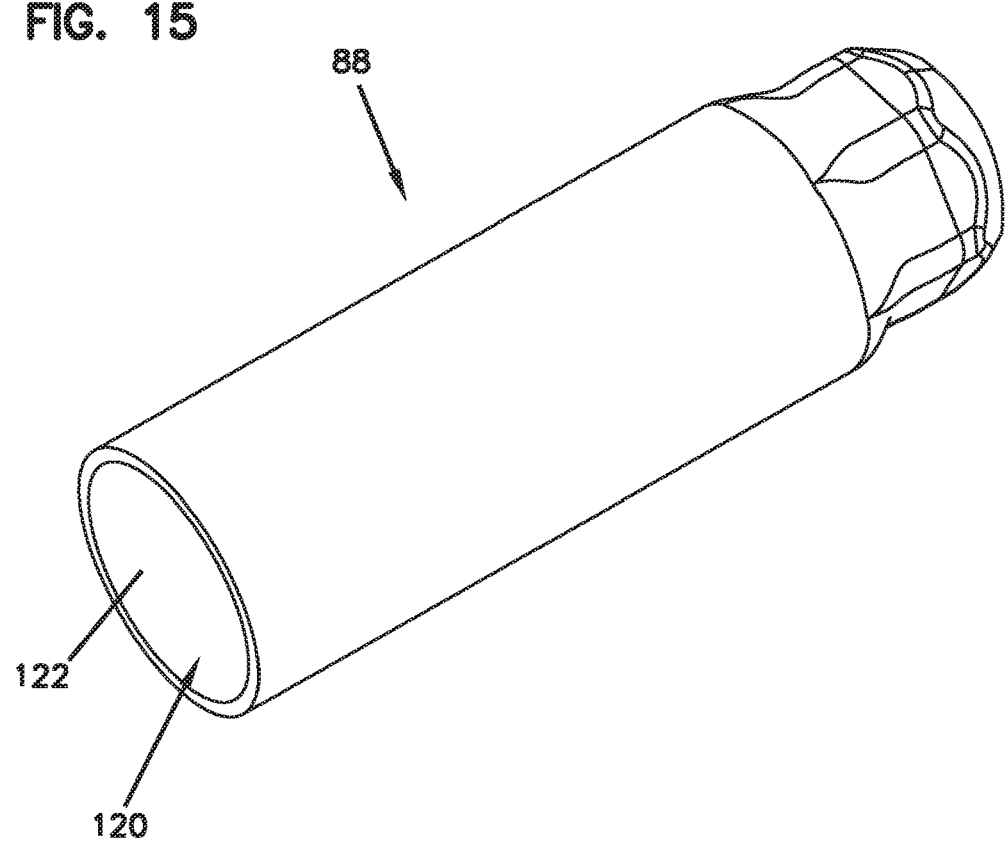
FIG. 15 is a rear perspective view of the front sleeve of one of the ferrule assemblies.
Figure 16:
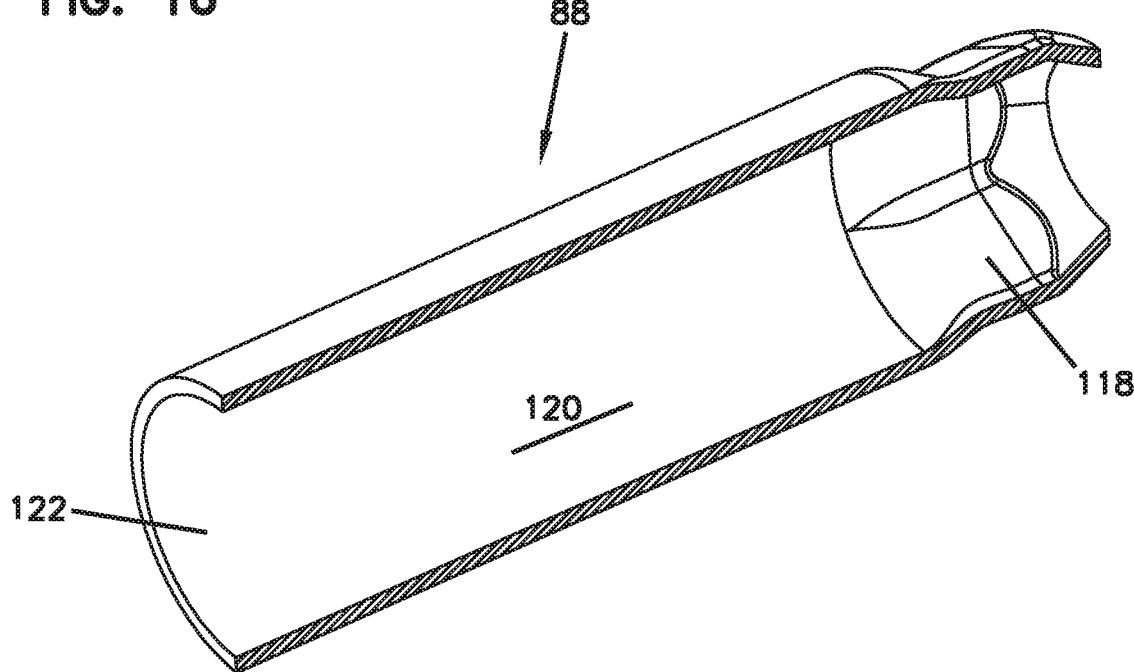
FIG. 16 is a rear perspective view in cross-section of the front sleeve of FIG. 15.
Figure 17:
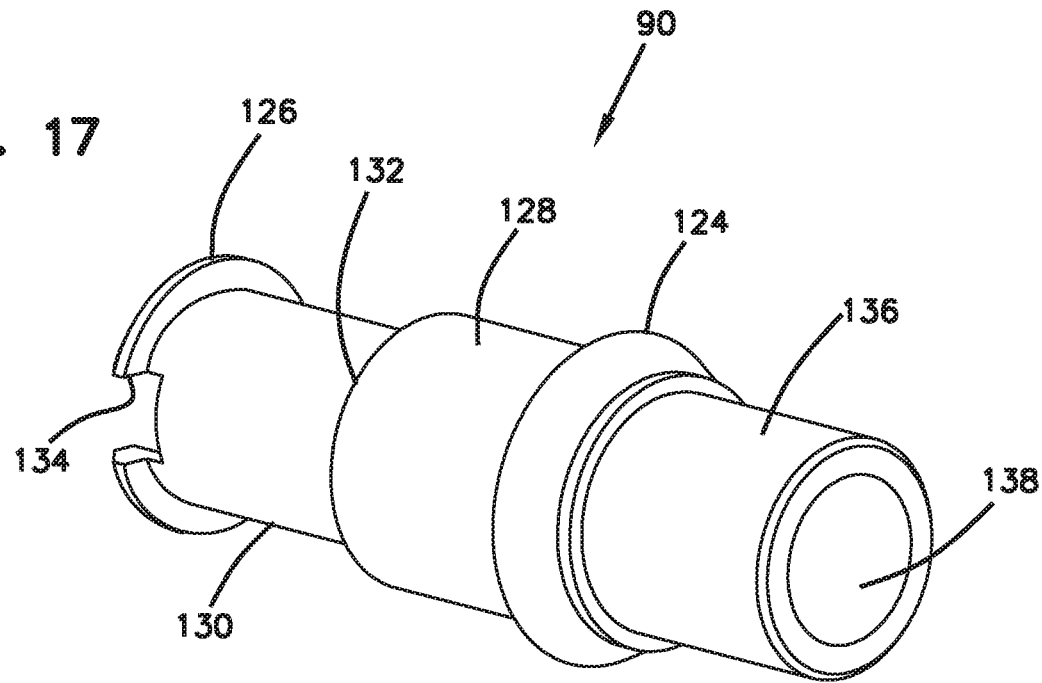
FIG. 17 is a perspective view of the rear sleeve of one of the ferrule assemblies.
Figure 18:
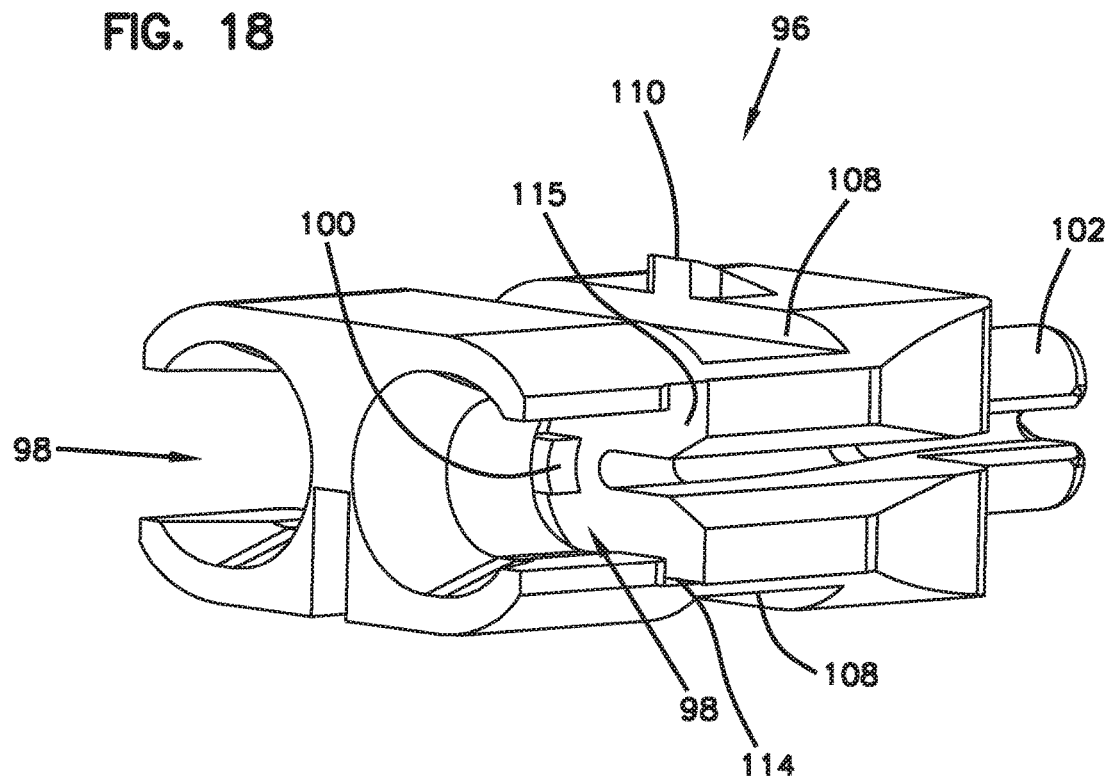
FIG. 18 is a front perspective view of the holder of the connector.
Figure 19:
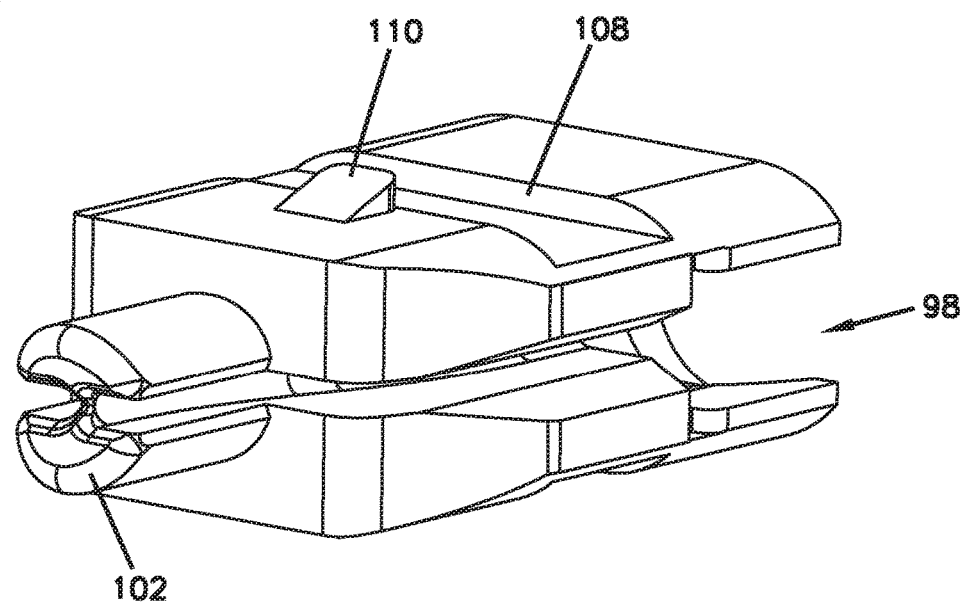
FIG. 19 is a rear perspective view of the holder of the connector.
Figure 20:
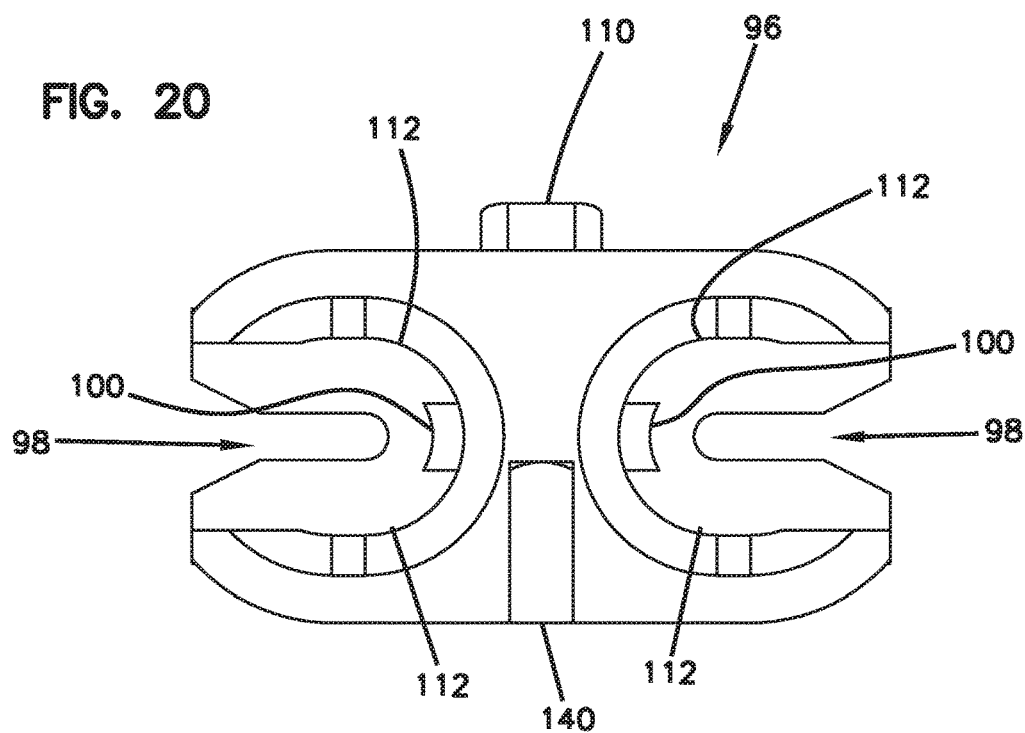
FIG. 20 is a front view of the holder of the connector.
Figure 21:
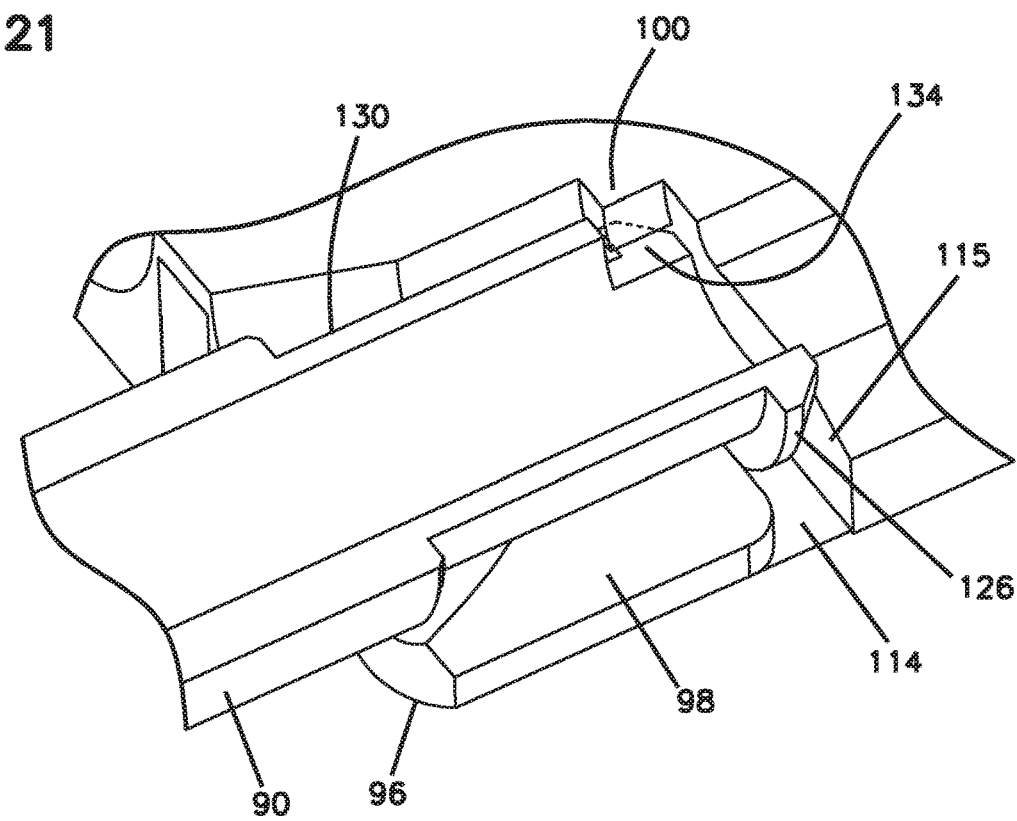
FIG. 21 is front perspective view in cross-section showing one of the rear sleeves mounted to the holder.
Figure 22:
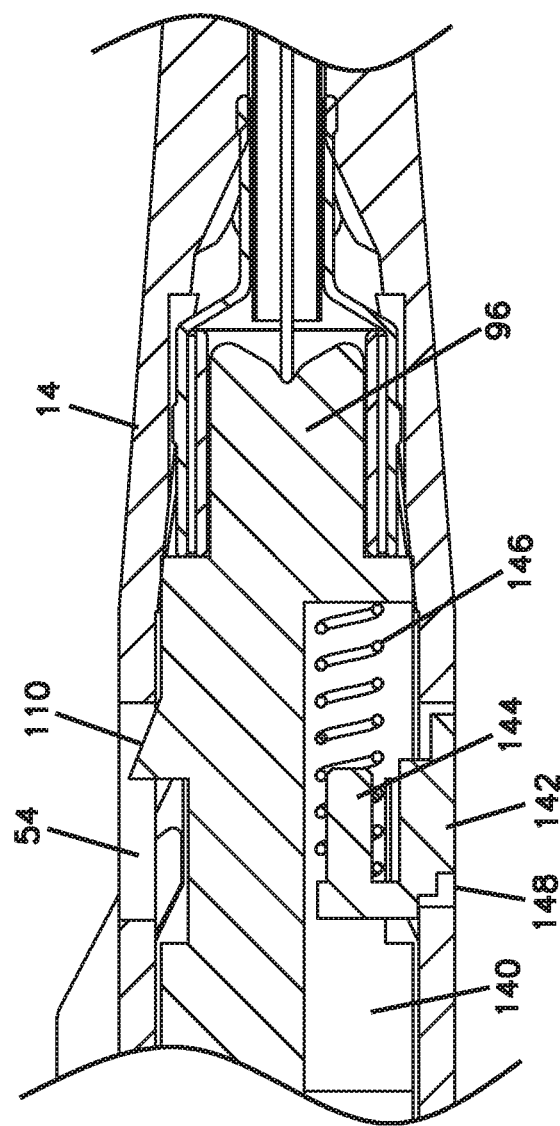
FIG. 22 is a cross-sectional side view of the connector along the centerline.

Referring now to FIGS. 1-22, an example connector 10 includes two fiber optic connector portions 12 and a boot 14. Connector portions 12 each include a ferrule 78 for holding a fiber optic cable. Connector 10 may also be referred to as a duplex connector assembly or duplex connector. Connector 10 is matable to an adapter 200 shown in FIGS. 23-25. Adapter 200 mates two connectors 10 together or mates another connector to connector 10 for fiber optic signal transmission.

The two connector portions 12 of connector 10 are arranged in a parallel position. Each connector portion 12 has a latch 18 including a latch body 20 with a proximal end 22 and a distal end 24. Latch 18 pivots around a connection point 26 during latching and unlatching of latch 18. Latch 18 secures connector 10 to adapter 200. Boot 14 is movable away from connector portions 12 in a longitudinal direction (Direction A in FIG. 2) causing pivoting movement of latch 18 about connection point 26 (Direction B in FIG. 2). Such pivoting movement allows for unlatching of connector portions 12 from adapter 200. Boot 14 simultaneously moves both latches 18 to allow for connector 10 to be unlatched from a duplex adapter or adapters with side-by-side ports 210. Latch body 20 includes a shoulder 28 which mates with latching shoulder 208 of adapter 200 to secure the connector 10 to the adapter 200.

In the illustrated embodiment, each connector portion 12 defines an LC profile, meaning that the connector portion 12 can mate with an LC adapter.

Boot 14 includes slots 50 which receive distal ends 24 of latch 18. Slots 50 and proximal ends 22 are angled so as to cause a lifting motion for proximal ends 22 which results in a downward movement of distal ends 24 of latch 18 when boot 14 is pulled longitudinally away from a remainder of connector 10. Compare FIGS. 2 and 3. A user can pull on boot 14 in a longitudinal direction away from the ferrules, and remove the connector 10 from the adapter 200, without directly engaging latches 18.

Connector portion 12 includes a front housing 32 and a ferrule assembly 76. Ferrule assembly 76 includes a ferrule 78, a hub 80 which holds the ferrule 78, and a spring 82 which biases hub 80 and ferrule 78 toward front housing 32. A front sleeve 88 and a rear sleeve 90 are mounted together with the ferrule 78, the hub 80, and the spring 82 housed inside to form the ferrule assembly 76. An internal tube 84 is provided extending from the hub 80. Tube 84 prevents epoxy from interfering with the movement of the ferrule 78, the hub 80 and the spring 82. The rear sleeve 90 is received in holder 96 through a side slot 98. A rear crimp ring 104 and a crimp sleeve 106 allow crimping of a cable 150 to holder 96.

A clip 180 may be used to hold connector portions 12 in the desired position as shown in FIG. 1. If an alternative position of connectors 12 is desired, such as to reverse the polarity of the connector portions 12, clip 180 is removed, thereby allowing rotation of the front housings 32 with the latches to an opposite side of connector 10. Such operation is desirable to change the polarity of connector portions 12 with respect to boot 14. Once the front housings 32 are rotated, clip 180 is repositioned to maintain the front housings 32 in the new desired position. Boot 14 includes similar slots 52 on an opposite side of boot 14 so that boot 14 does not need to be rotated. Clip 180 can also be provided with different dimensions so as to change the spacing between connector portions 12, if desired. Clip 180 includes outer arms 182, and an inner arm 184, and shoulders 186 on each of arms 182, 184 for securing to front housings 32 of the connector portions 12.

In the illustrated example, front housing 32 mounts to ferrule assembly 76. Ferrule assembly 76 mounts to holder 96. Holder 96, which mounts to two ferrule assemblies 76, mounts to boot 14. Boot 14 is engageable with latches 18 of the front housings 32. Cable 150 is crimped to holder 96. The individual fibers of cable 150 are fixed to the ferrules 78, such as with epoxy.

Cable 150 includes an outer jacket 152, strength members 154, typically in the form of an aramid yarn, and two fibers 156, 158. Each fiber 156, 158 includes an outer coating 160 and a bare fiber 162. Typically, the coating 160 is removed and the bare fiber 162 is inserted into the ferrule 78, and affixed, such as with epoxy.

Front housing 32 includes a key 34 for mating with an inner passage 202 of adapter 200. Alignment sleeve 204 aligns the ferrules 78 to mate two connectors 10. Adapter 200 includes two ferrule alignment sleeves 204, and side-by-side passages 202 for each receiving a connector portion 12.

Front housing 32 includes latch 18 on an exterior, and an inner passage 36 in the interior for receiving ferrule assembly 76. Inner passage 36 includes a front shoulder 38, an inner slot 40 and a side slot 42.

Boot 14 includes an opening 54 for mating with structure on holder 96. Boot 14 includes an interior area 56, and a flexible rear portion 58.

Holder 96 includes a tab 100 for mating with structure on rear sleeve 90 of ferrule assembly 76. Holder 96 includes a rear projection 102 for receiving the crimp ring 104 and the crimp sleeve 106. Holder 96 includes cross slots 108 for receiving proximal ends 22 of latch 18. A shoulder 110 mates with opening 54 of boot 14 to allow longitudinal movement of boot 14 relative to holder 96. Side slots 98 lead to oval openings 112. Oval openings 112 allow for lateral movement of connector portions 12 to vary the lateral spacing. Oval openings 112 clip over ferrule assemblies 76 to retain the assemblies with holder 96.

Holder 96 is provided with a lateral slot 114, and a rear stop 115 for mating with rear sleeve 90 of each ferrule assembly 76.

Front sleeve 88 of ferrule assembly 76 includes a keyed surface 118 for mating with a keyed surface 116 of hub 80.

Inner surface 122 of front sleeve 88 is press fit onto outer surface 136 of rear sleeve 90. Rear sleeve 138 defines an inner passage 138.

Rear sleeve 90 includes a front collar 124 received in inner slot 40 of front housing 32. Rear collar 126 of rear sleeve 90 is received in slot 114 of holder 96. Outer surface 128 of rear sleeve 90 includes a reduced diameter portion 130, and a shoulder 132. Reduced diameter portion 130 is received in oval opening 112. Oval opening 112 retains rear sleeve as the side slot 98 is slightly smaller than reduced diameter portion 130. Notch 134 of rear sleeve 90 receives tab 100 of holder 96. Rear sleeve 90 and the rest of ferrule assembly 76 is prevented from rotating relative to holder 96.

To assemble connector 10, cable 150 is inserted through boot 14, crimp ring 104 and crimp sleeve 106. The fibers 156, 158 are affixed to the ferrules 78 of the ferrule assemblies 76. The ferrule assemblies 76 with the front housings 32 attached are mounted to the holder 96. The cable jacket 152 and strength members 154 are crimped to rear projection 106 between crimp ring 104 and crimp sleeve 106. Although crimp sleeve 106 is optional is some implementations. Boot 14 is pulled over holder 96 until shoulder 110 of holder 96 is retained in opening 54 of boot 14, and proximal ends 22 of the latches 18 are in one of slots 50, 52 of boot 14.

To switch polarity of connector portions 12, the front housings 32 are rotated in opposite directions so that the proximal ends 22 of the latches 18 are moved between slots 50, 52. During polarity switching, boot 14 remains mounted to housing 96. Clip 180 is removed during the polarity switching operation.

Front housings 32 with latches 18 can each be made as a one-piece element. Front housing 32 defines an LC profile for mating with ports 210 of adapter 200. As noted, front housings 32 are rotatable about the longitudinal axis of each connector portion 12 to change the polarity of the connector 10, without rotating the ferrule 78 or the ferrule assembly 76.

While the example connector 10 includes two fiber optic connector portions 12 and a boot 14, it is to be appreciated that connector 10 can include a single connector portion 12.

In some examples, clip 180 is not used. Clip 180 can be used to provide a certain spacing of connector portions 12. One spacing is sized at 6.25 millimeters. See Dimension D of FIG. 9. Another spacing that may be used is 5.25 millimeters. See Dimension C of FIG. 9. A different clip 180 with a different spacing may be used, or the clip may be not used for the closer spacing.

Boot 14 is shown as including a spring return feature. Pocket 140 of holder 96 receives a spring holder 142 including a peg 144. Spring holder 142 with peg 144 holds a return spring 146. Spring 146 biases boot 14 toward the forward position of FIG. 2 when released by the user. When the user pulls boot 14 longitudinally away from the connector portions 12, the spring 146 is compressed. Spring 146 moves the boot 14 back to the rest position of FIG. 2 upon release by the user. Pocket 140 of holder 96 is accessible through opening 148.

Referring now to FIGS. 26-41, an example of another fiber optic adapter 300 that is configured for mating connectors similar to the connectors 10 of FIGS. 1-22 described above is illustrated.

Figure 23:
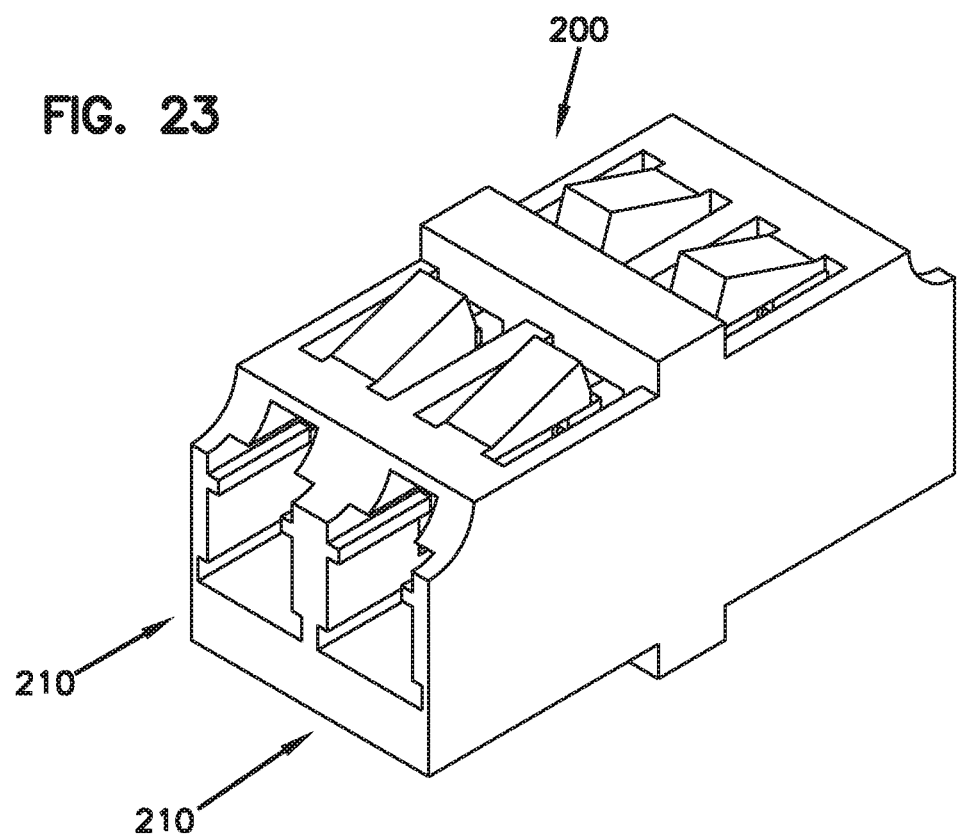
FIGS. 23 and 24 are two perspective views of a duplex adapter for mating with the connector of FIG. 1.
Figure 24:
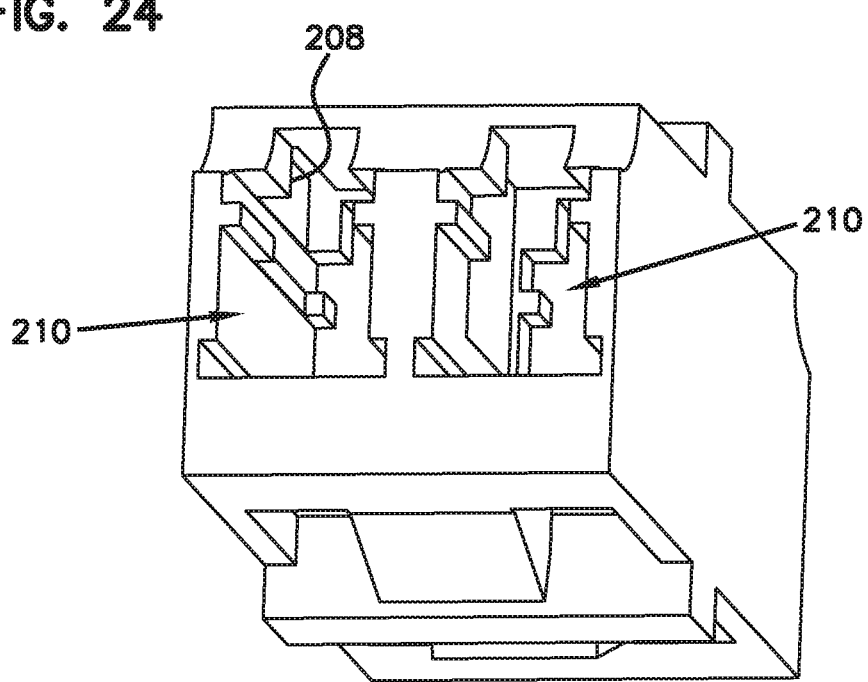
Figure 25:
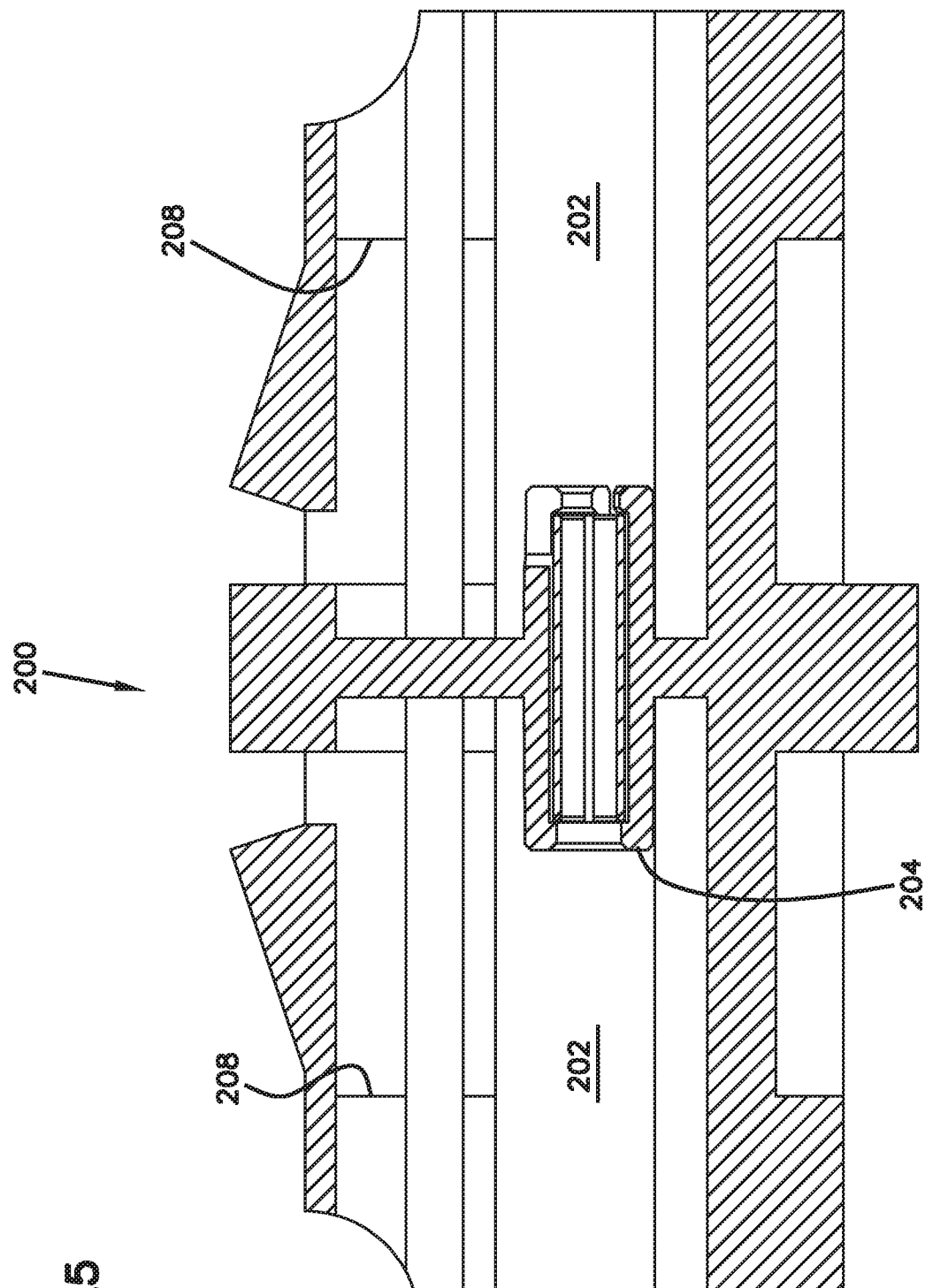
FIG. 25 is a cross-sectional view of the duplex adapter of FIGS. 23 and 24.
Figure 26:
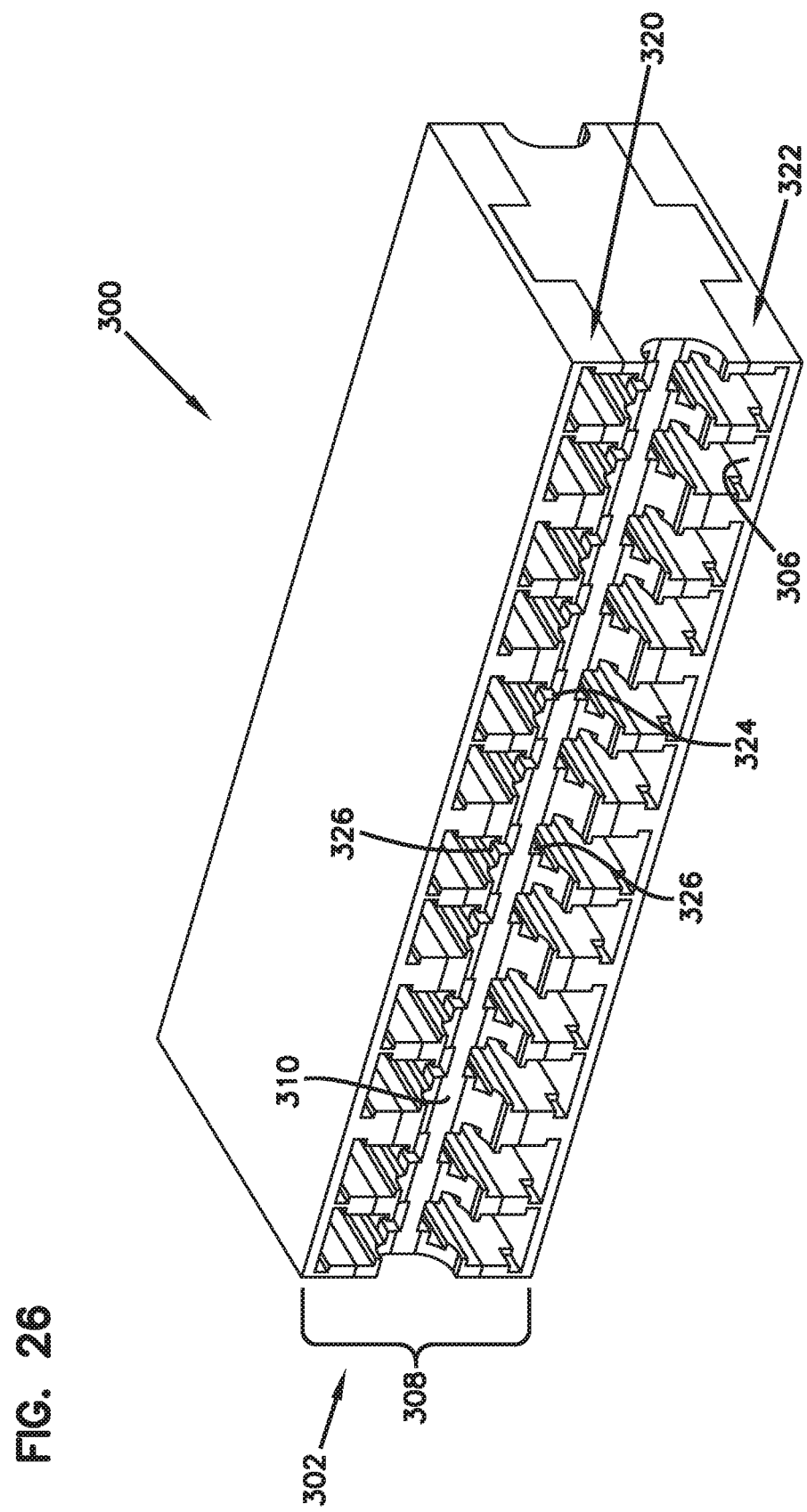
FIG. 26 is a front, right, top perspective view of an example adapter block including a connector port arrangement having features that are examples of inventive aspects in accordance with the present disclosure.
Figure 27:
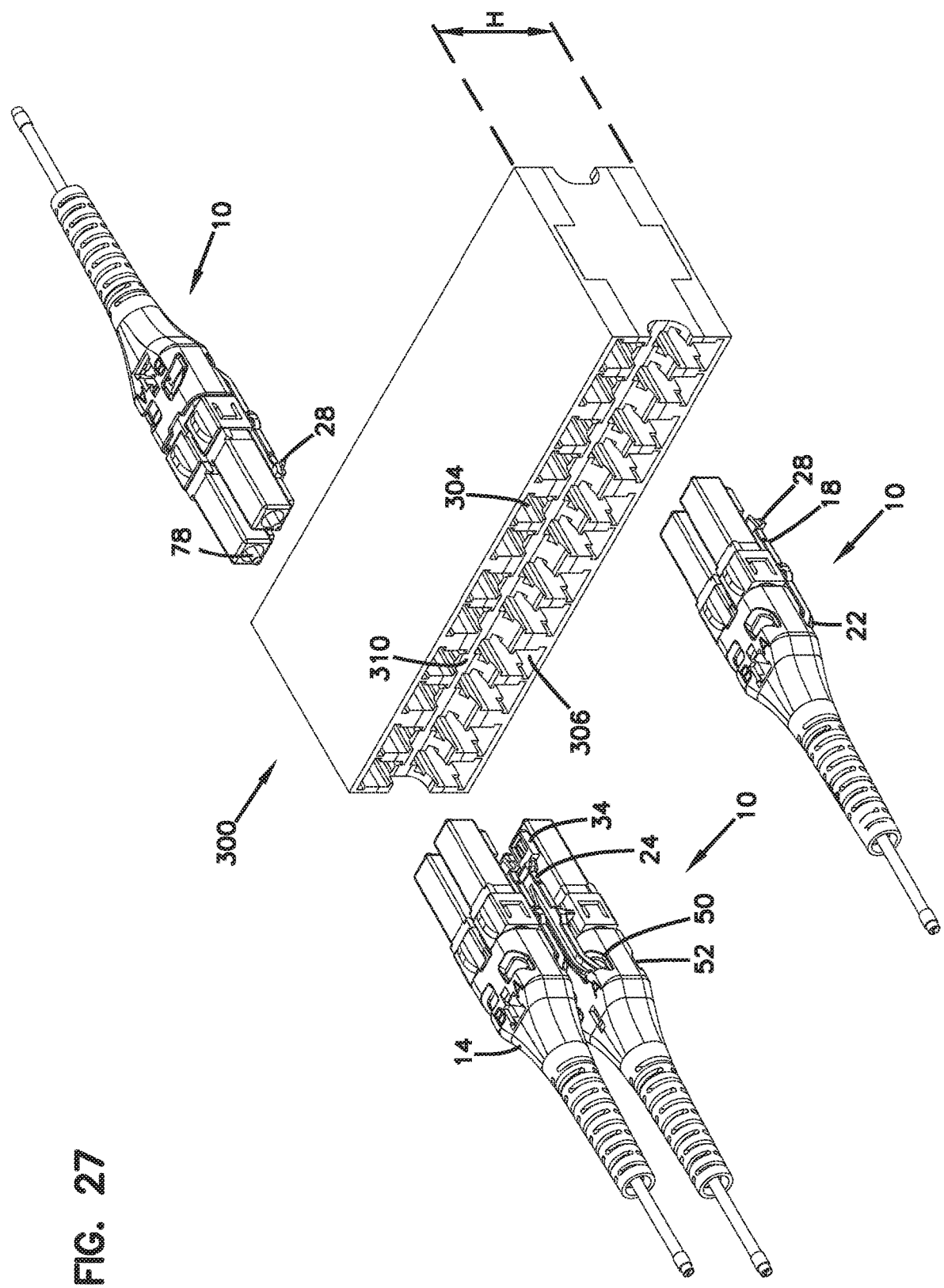
FIG. 27 illustrates the adapter block of FIG. 26 with a number of connectors similar to those shown in FIGS. 1-22 of the application in an exploded configuration.
Figure 28:
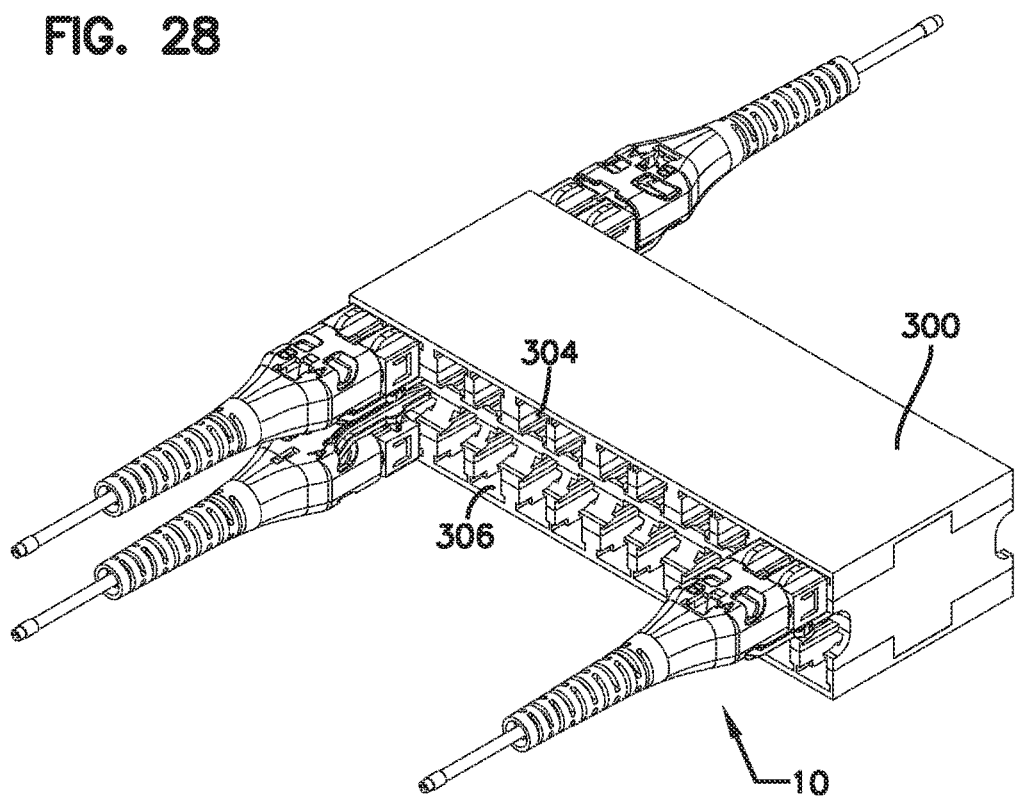
FIG. 28 illustrates the adapter block of FIG. 27 with the connectors coupled thereto.
Figure 29:
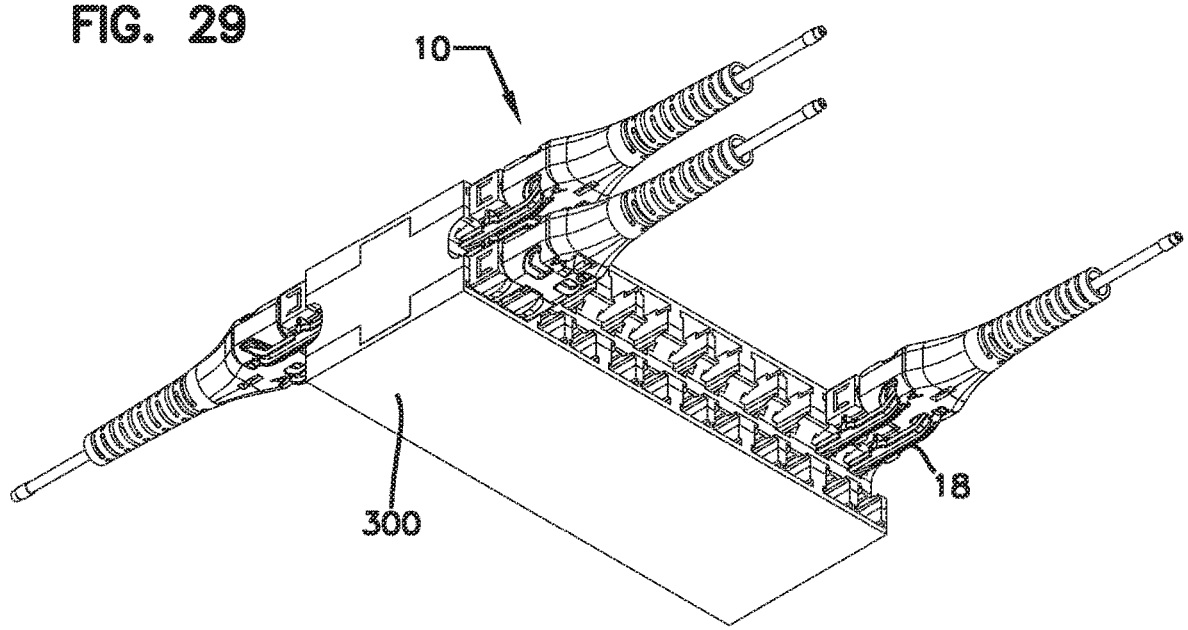
FIG. 29 is a front, bottom, left side perspective view of the adapter block of FIG. 28.
Figure 30:
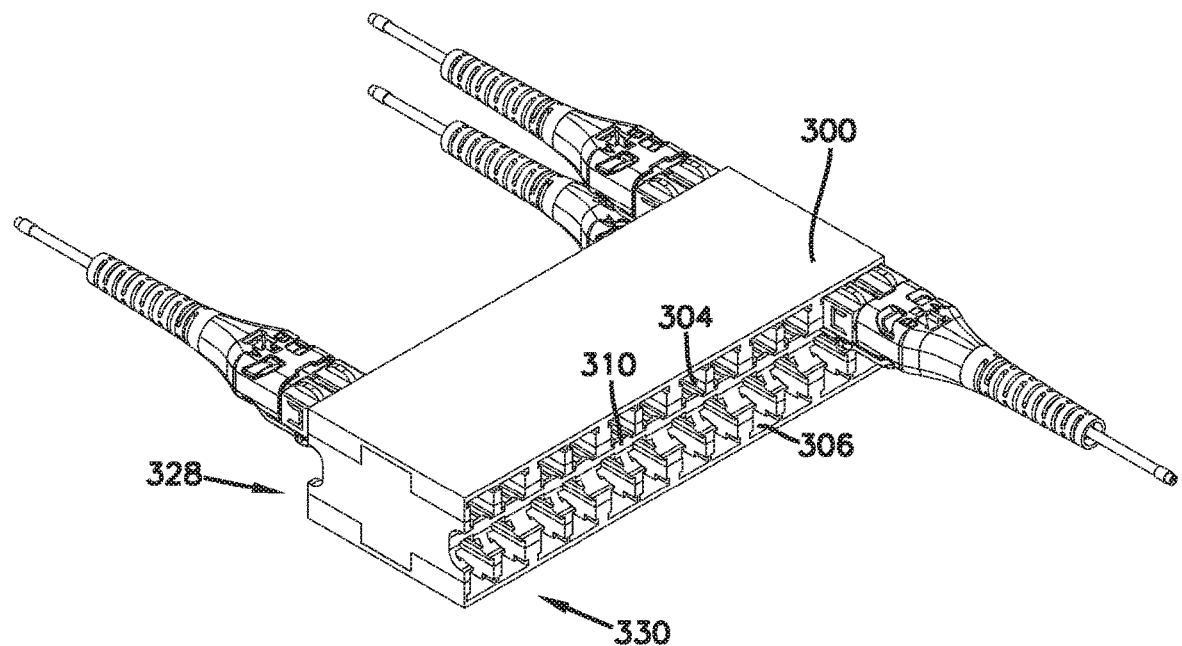
FIG. 30 is a rear, top, right side perspective view of the adapter block of FIG. 28.
Figure 31:
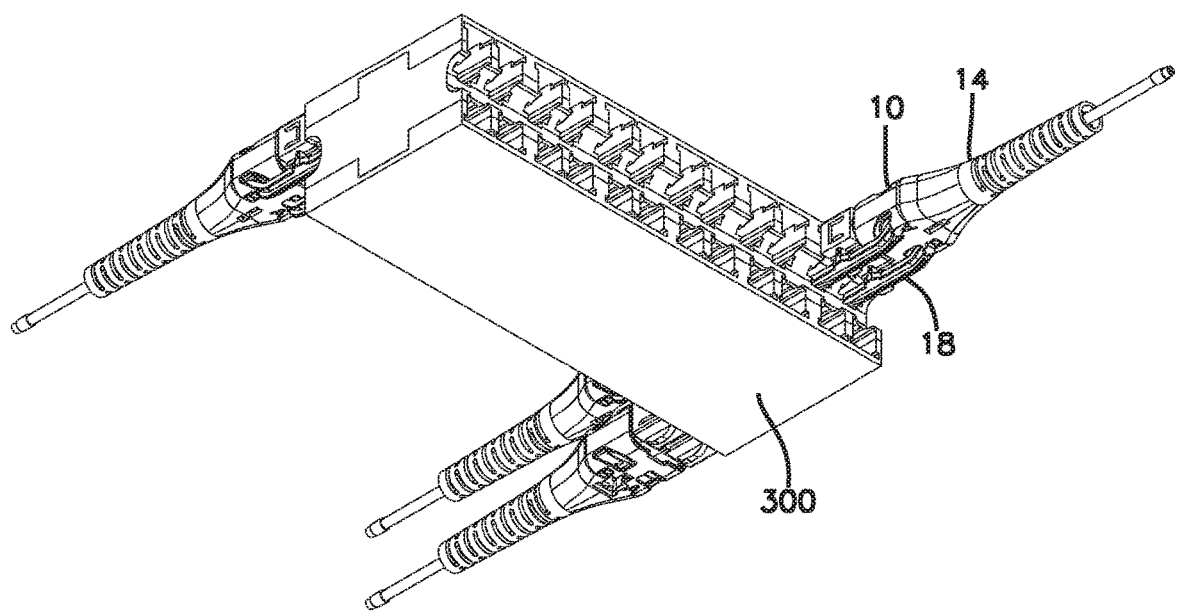
FIG. 31 is a rear, bottom, right side perspective view of the adapter block of FIG. 28.
Figure 32:
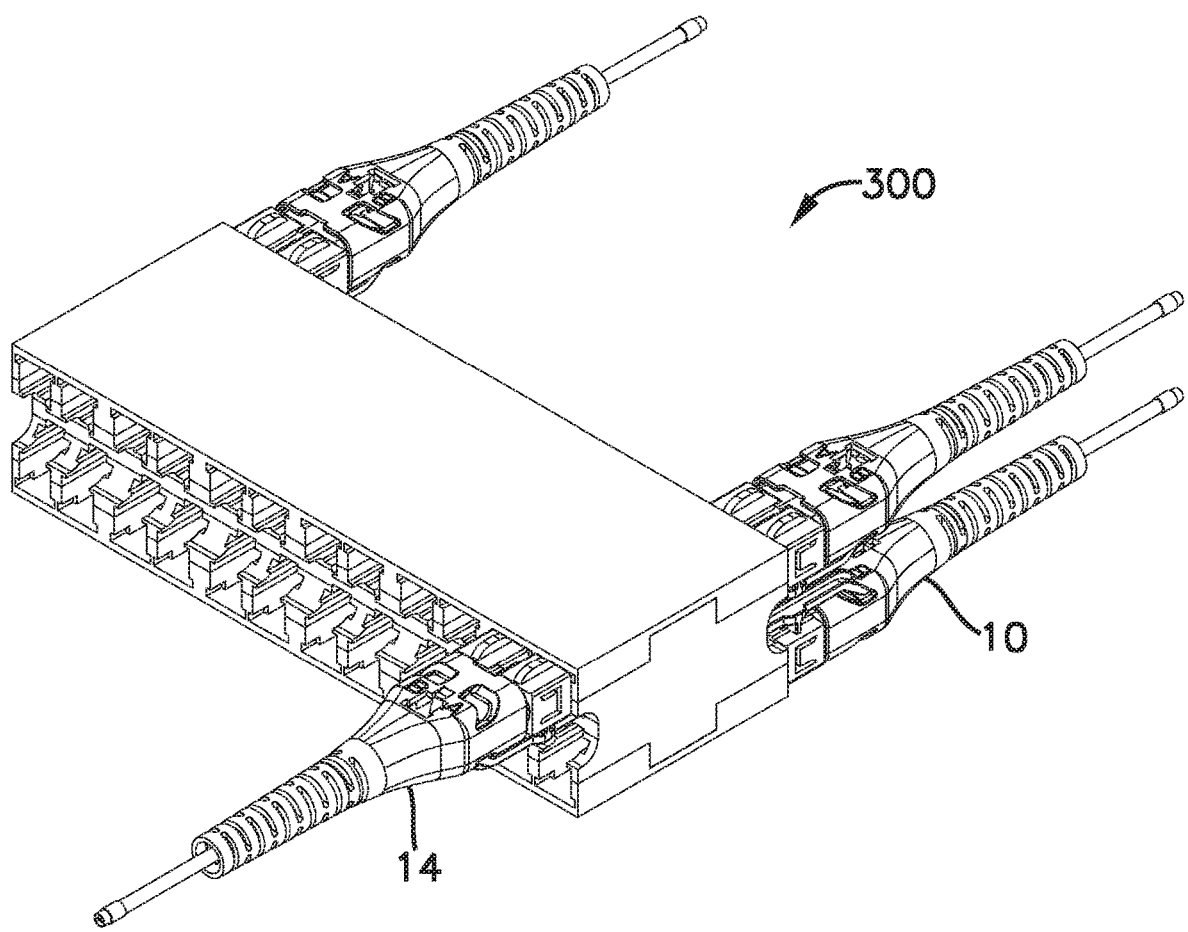
FIG. 32 is a rear, top, left side perspective view of the adapter block of FIG. 28.
Figure 33:
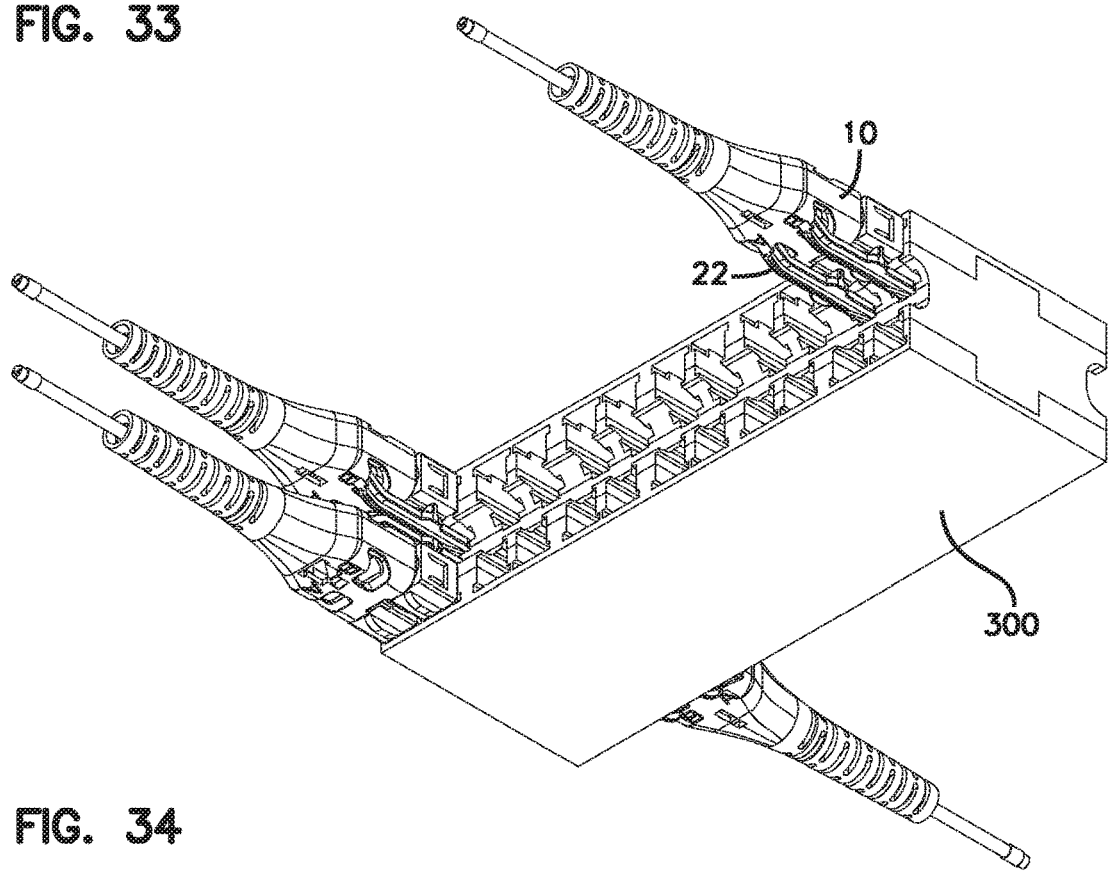
FIG. 33 is a front, bottom, right side perspective view of the adapter block of FIG. 28.
Figure 34:
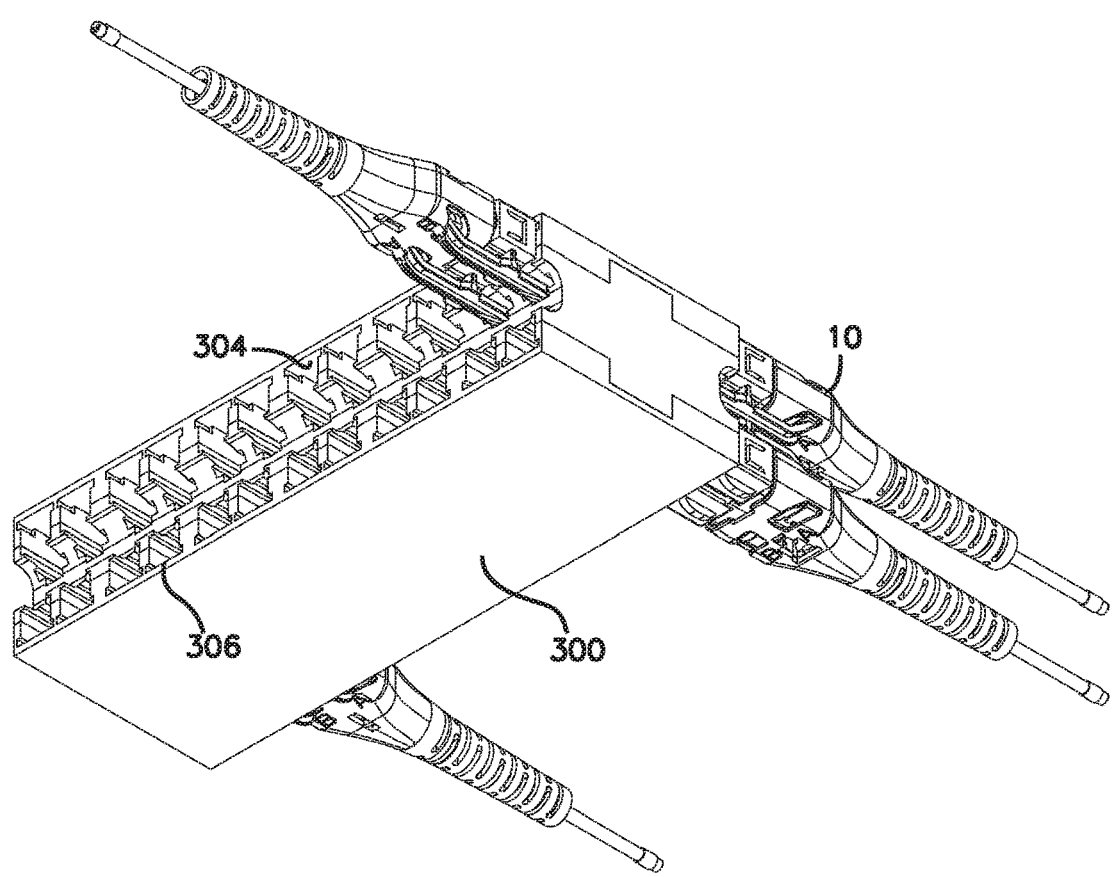
FIG. 34 is a rear, bottom, left side perspective view of the adapter block of FIG. 28.
Figure 35:
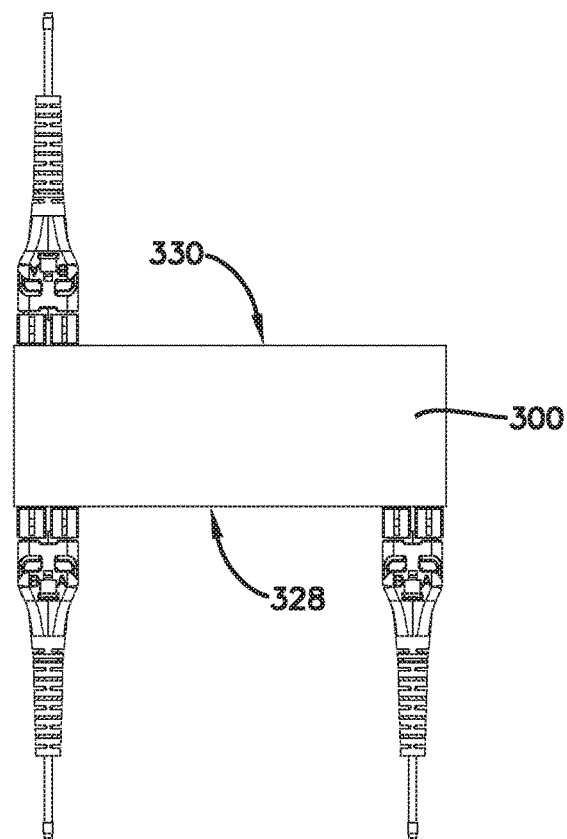
FIG. 35 is a top view of the adapter block of FIG. 28.
Figure 36:
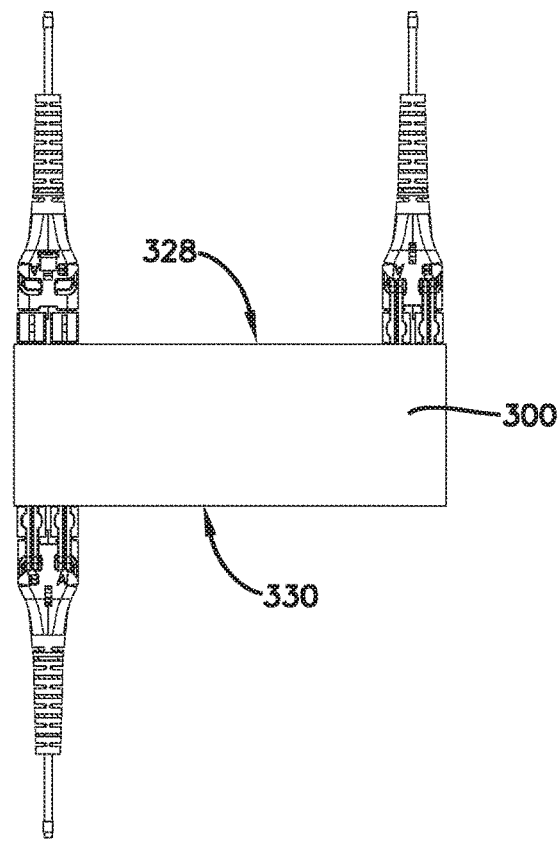
FIG. 36 is a bottom view of the adapter block of FIG. 28.
Figure 37:
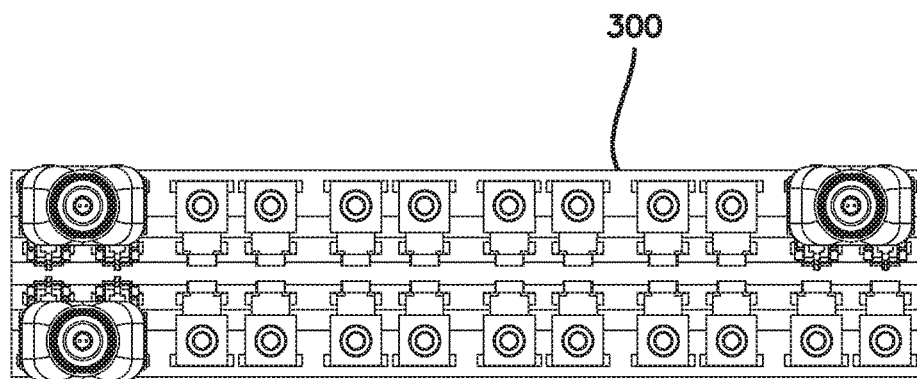
FIG. 37 is a front view of the adapter block of FIG. 28.
Figure 38:
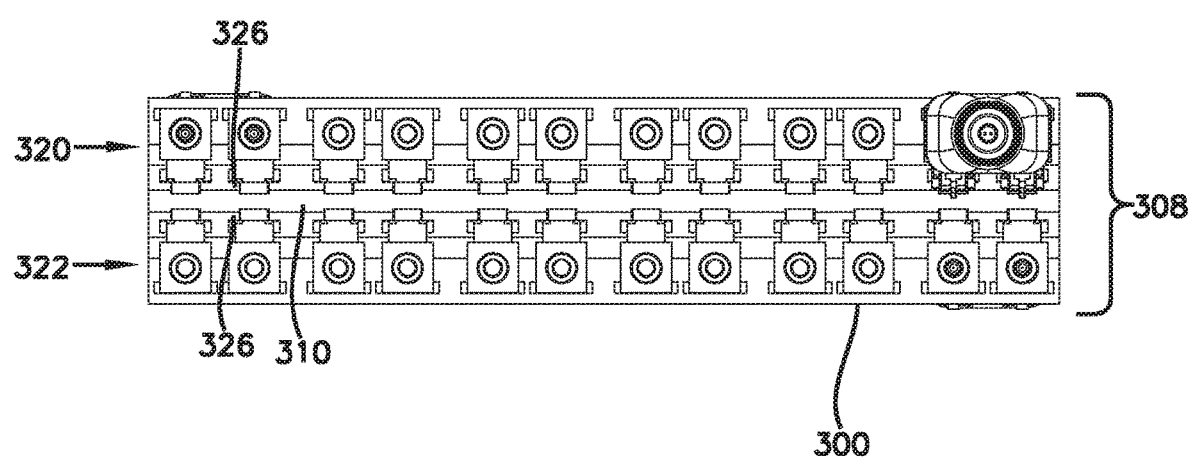
FIG. 38 is a rear view of the adapter block of FIG. 28.
Figure 41:
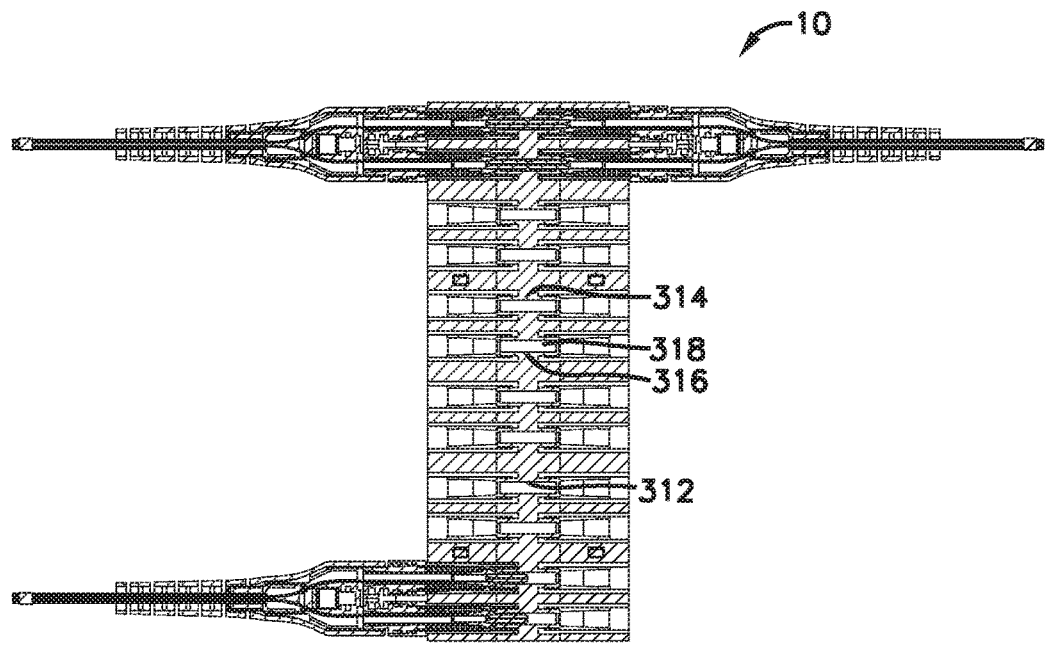
FIG. 41 is a cross-sectional view taken along line 41-41 of FIG. 39.

According to one example embodiment, the depicted fiber optic adapter 300, unlike the adapter 200 shown in FIGS. 23-25, is a dual layer adapter and provides a connector port arrangement 302 including at least one upper port or receptacle 304 and at least one lower port or receptacle 306 vertically aligned with the upper receptacle 304 to form a column 308 of receptacles. The column 308 includes a center divider 310 that divides the at least one upper receptacle 304 from the at least one lower receptacle 306.

In the depicted example, the dual layer adapter 300 is provided in the form of an adapter block comprising a plurality of the columns 308 of vertically aligned upper and lower receptacles 304, 306. According to one example as shown in FIGS. 26-41, the adapter block 300 is provided as a unitarily molded structure wherein all of the receptacles 304, 306 and the center divider 310 are formed as an integral unit, wherein ferrule alignment sleeves 312 may be inserted therein.

As noted, each adapter of the block 300 may define a ferrule alignment structure 314 located within an axial cavity extending through each adapter. The ferrule alignment structure 314 includes a sleeve mount 316 defining an axial bore 318 for receiving a ferrule alignment sleeve 312. In certain examples, where the adapter block 300 is a unitarily molded structure, the sleeve 312 may be inserted axially into the sleeve mount 316 after the block 300 has been molded. In other examples, wherein the adapter block 300 is not necessarily a unitarily molded structure, for example, as in an adapter block 300 formed from front and rear halves that are ultrasonically welded, the sleeve 312 may be inserted into the bore 318 from either end before welding the two adapter block halves together. It should be noted that in such examples, the front and rear halves may also be coupled together via other methods such as with snap-fit interlocking instead of ultrasonic welding.

In the example shown, the adapter block 300 defines twenty-four individual ports or receptacles, wherein twelve receptacles 306 are provided on a lower level 322 and twelve receptacles 304 are provided at an upper level 320. It should be noted that the twelve receptacles provided on each level 320, 322 may be grouped in duplex pairs and the adapter block 300 may be deemed to contain six duplex adapters on each level 320, 322. Other numbers of receptacles are possible depending upon the connectivity need.

The depicted adapter block 300 is configured such that the latches 18 of the connectors 10 coupled at the lower level 322 face toward the latches 18 of the connectors 10 coupled at the upper level 320 when the connectors 10 are mounted to the lower and upper receptacles 306, 304. For each given column 308 of the upper and lower receptacles, the center divider 310 that is shared by both the lower receptacle 306 and the upper receptacle 304 defines at least a portion of the latching structures 324 of the adapter 300, as will be described in further detail below.

As shown, the center divider 310 is integrally molded into the adapter block 300. By defining a single center divider 310 that is used by both the upper and lower receptacles 304, 306 in providing latching structures 324 for the connectors 10, the adapter block 300 is able to increase connection density. For example, in the depicted example, for an adapter block 300 that is configured to be used with the connectors 10 described above in FIGS. 1-22, the adapter block 300 may define a height H of about 0.75 inches. It should be noted that the height H of 0.75 inches is configured to accommodate connectors 10 such as those described above with respect to FIGS. 1-22 that have latches 18 which can be unlocked by longitudinally-movable boots 14. In other examples, wherein the adapter block 300 may be configured to couple standard LC connectors with standard latches, the divider 310 may be provided with a slightly wider profile, with the height H of the adapter block 300 being less than about 0.875 inches. It should be understood that the adapter block 300 may be modified for different types of fiber optic connector formats. The shared center divider 310 between the upper level 320 and the lower level 322 of receptacles provides the ability to increase the density of the adapter block 300 to levels not found in prior fiber optic adapters.

As noted above, the center divider 310 includes or defines at least a portion of the latching structures 324, specifically latching shoulders 326, for both an upper receptacle 304 and a lower receptacle 306 for each given column 308 of the receptacles. As described above, the shoulders 28 defined on the latches 18 of connectors 10 similar to those described above with respect to FIGS. 1-22 mate with the latching shoulders 326 of the upper and lower adapter receptacles 304, 306 to secure the connectors 10 to the adapters 300. The adapter block 300 is configured such that when the connectors 10 are mated to the adapter ports within a given column 308, the latch body 20 of a connector 10 coupled at the lower level 322 faces toward the latch body 20 of a connector 10 coupled at the upper level 320.

In connectors 10 similar to those shown in FIGS. 1-22, the front housings 32 thereof may include a key 34 for mating with an inner passage of adapters 300. Alignment sleeve 312 within each adapter 300 aligns the ferrules 78 to mate two such connectors 10. As noted above, each adapter of the adapter block 300 includes a ferrule alignment sleeve 312 for receiving and mating two connectors 10.

As described above with respect to FIGS. 1-22, in removing connectors similar to connectors 10, the boot 14 of each connector 10 may include slots 50, 52 which receive distal ends 24 of latch 18. Slots 50, 52 and proximal ends 22 are angled so as to cause a lifting motion for proximal ends 22 which results in a downward movement of distal ends 24 of latch 18 when boot 14 is pulled longitudinally away from a remainder of connector 10. A user can pull on boot 14 in a longitudinal direction away from the ferrules 78, and remove a connector 10 from the adapter ports 304, 306, without directly engaging latches 18.

In the depicted embodiment, the connector port arrangement 302 shown in FIGS. 26-41 is part of a fiber optic adapter 300 defining ports at both a front end 328 and a rear end 330 for optically mating fiber optic connectors 10. Each fiber optic adapter of the block 300 of FIGS. 26-41 defines symmetric ports at both the front and rear ends 328, 330 of the adapter 300 for mating similar fiber optic connectors 10. In other examples, as will be described below, the fiber optic adapters 300 may define dissimilar ports at the front and rear ends 328, 330 for mating two different types of connectors.

Figure 42:
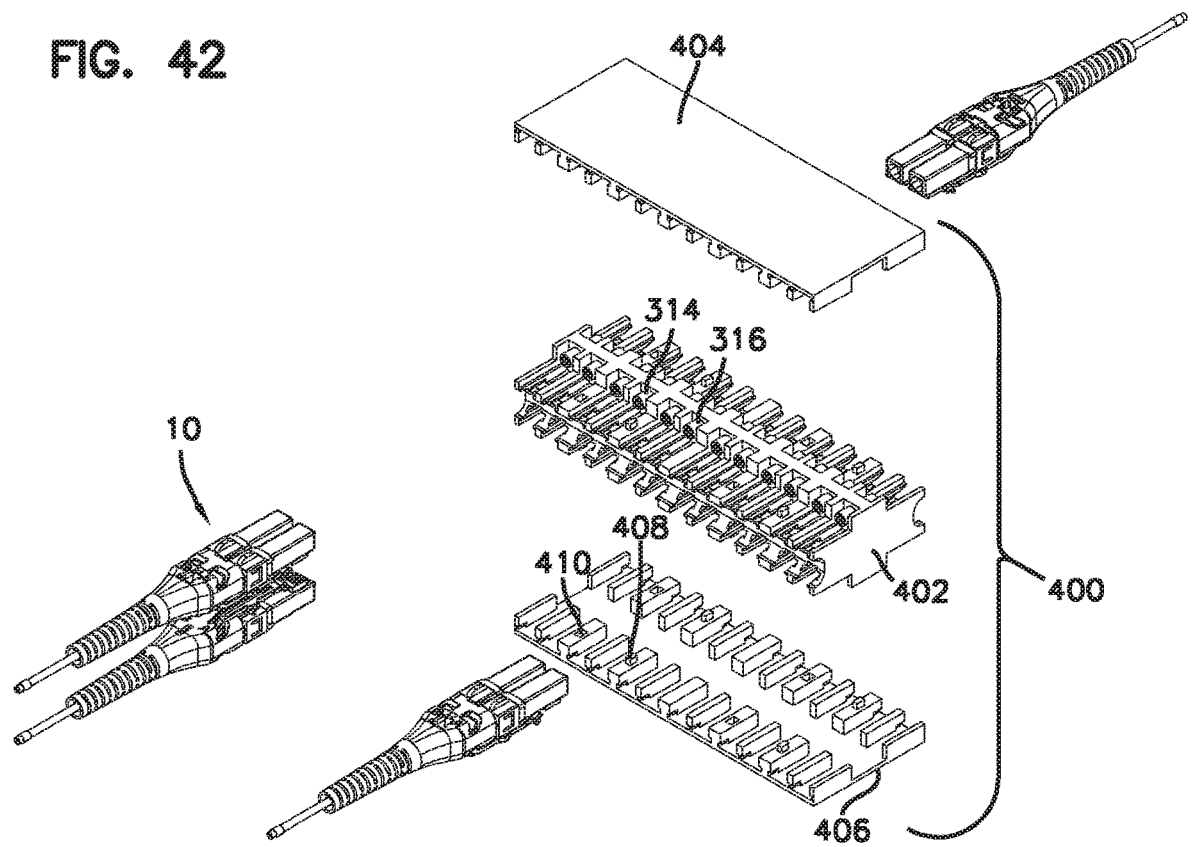
FIG. 42 illustrates an example of an adapter block similar to that shown in FIGS. 26-41 but formed from removable features that are coupled together, the adapter block shown in an exploded configuration and including a connector port arrangement having features that are examples of inventive aspects in accordance with the present disclosure similar to that shown in FIGS. 26-41.
Figure 43:
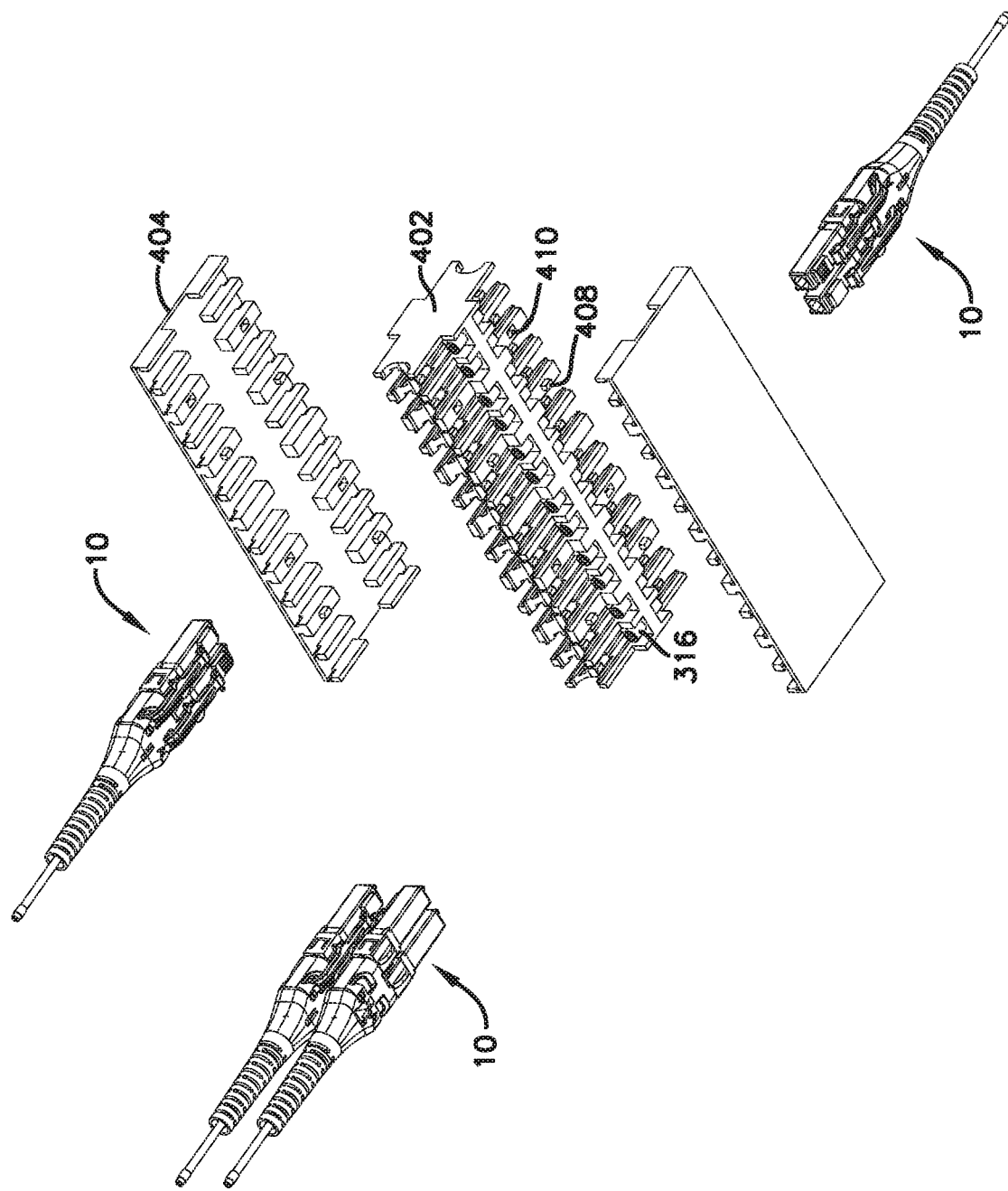
FIG. 43 is a front, bottom, right side perspective view of the adapter block of FIG. 42 shown in an exploded configuration.
Figure 44:
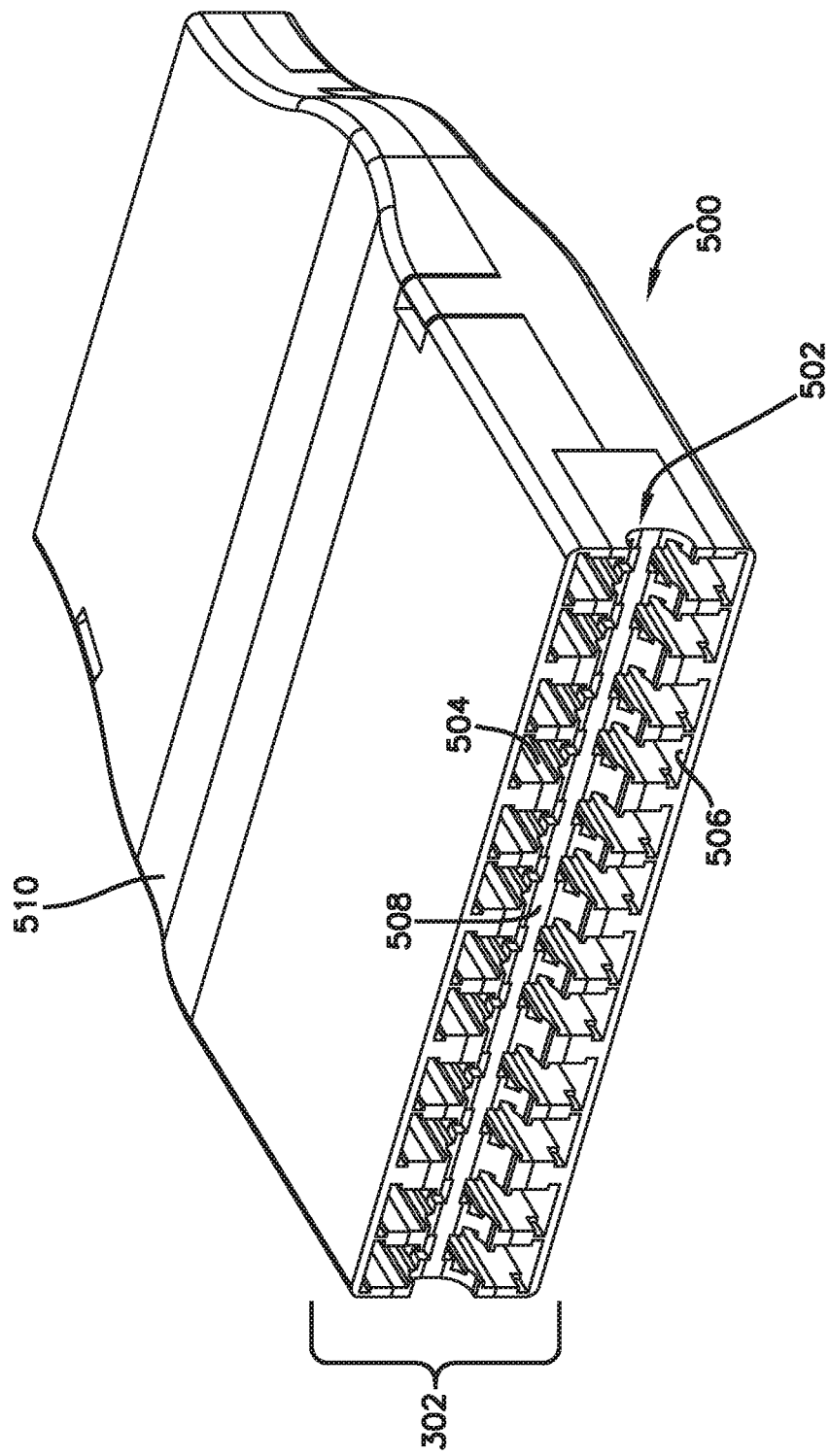
FIG. 44 is a front, right, top perspective view of an example fiber optic cassette including a connector port arrangement similar to that shown for the adapter blocks of FIGS. 26-43, the connector port arrangement having features that are examples of inventive aspects in accordance with the present disclosure.
Figure 45:
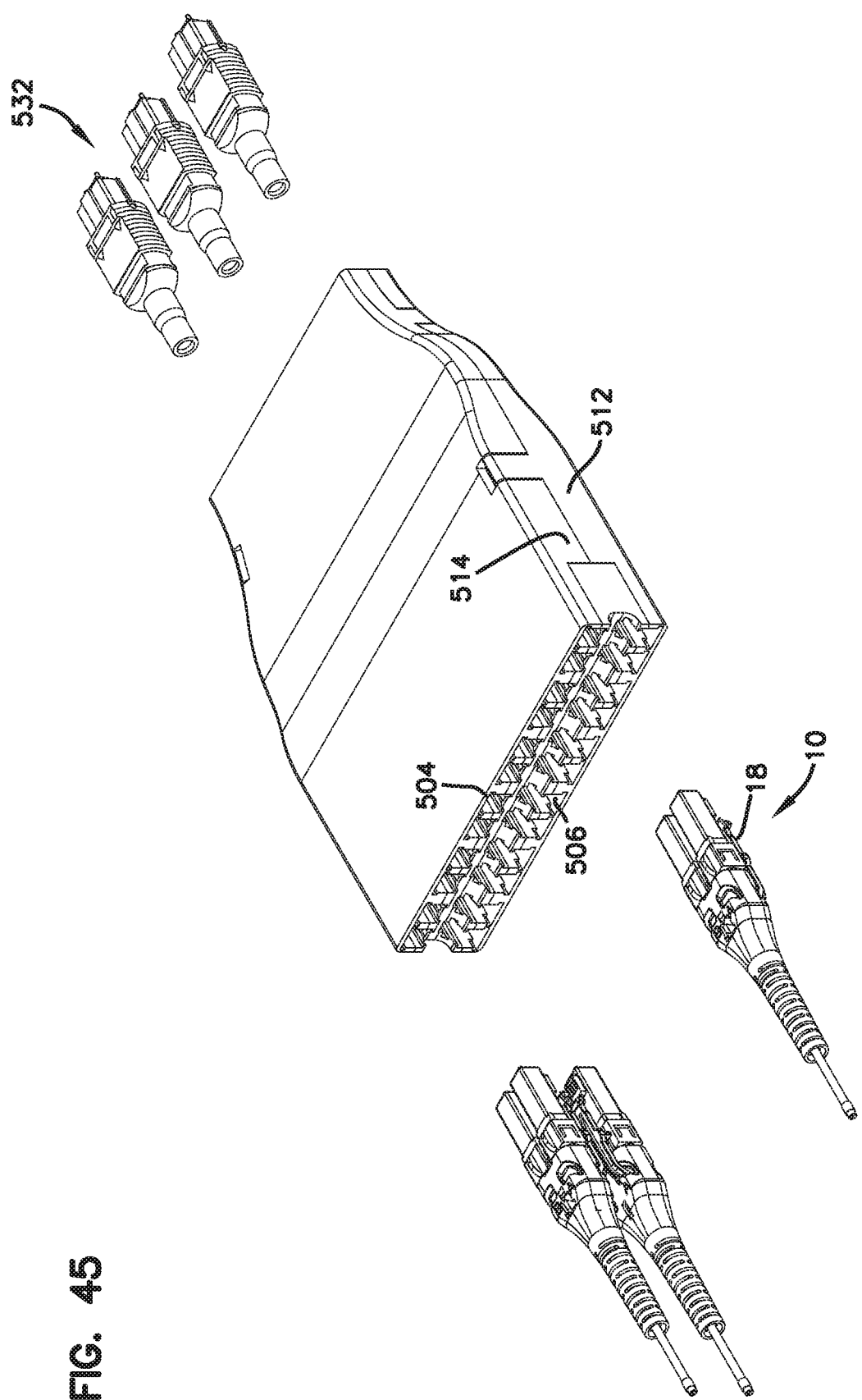
FIG. 45 illustrates the cassette of FIG. 44 with a number of connectors similar to those shown in FIGS. 1-22 of the application exploded off the front connector port arrangement and a number of multi-fiber connectors exploded off the rear of the cassette.
Figure 46:
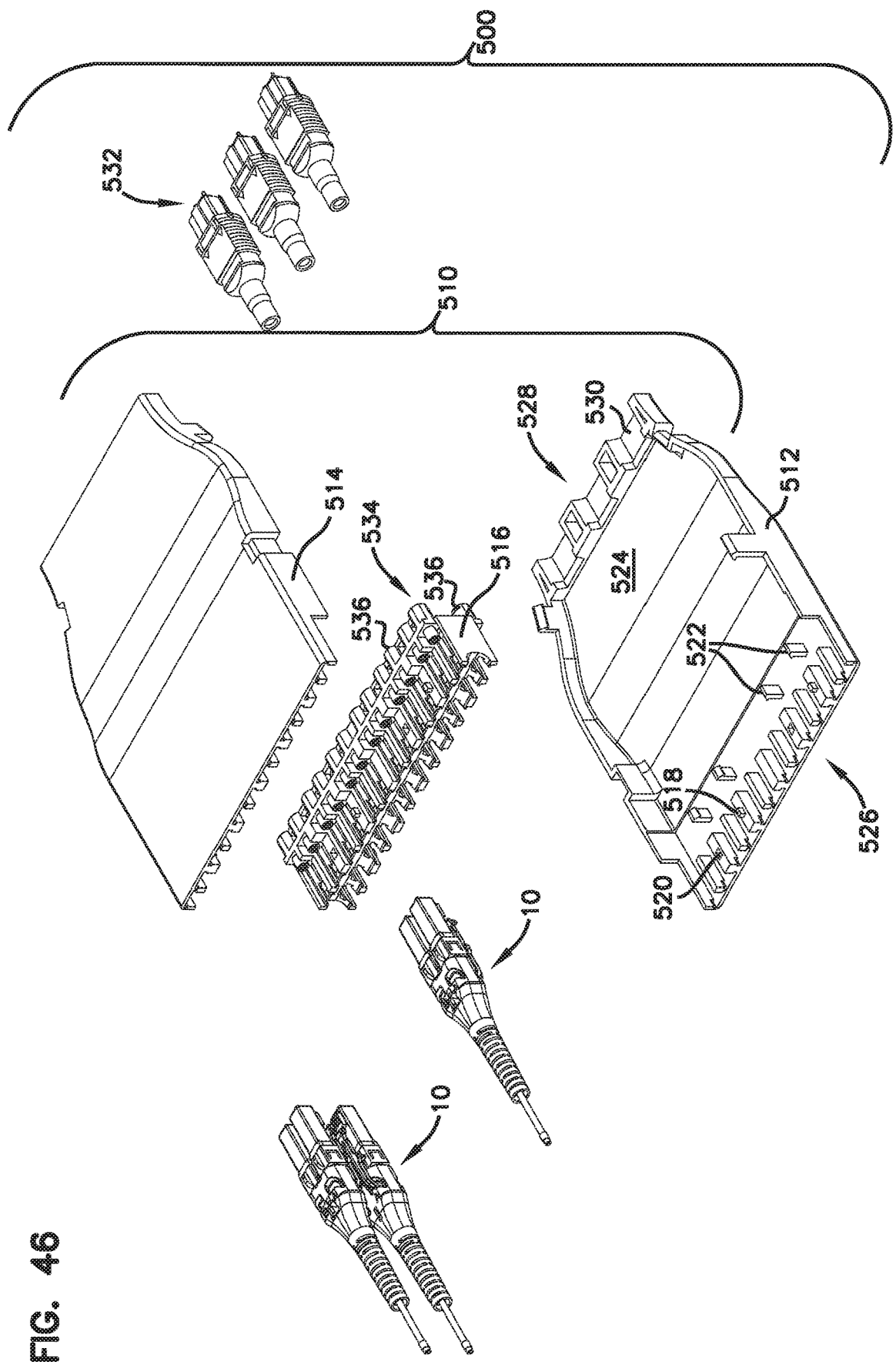
FIG. 46 illustrates the cassette of FIGS. 44-45 in a fully exploded configuration.
Figure 47:
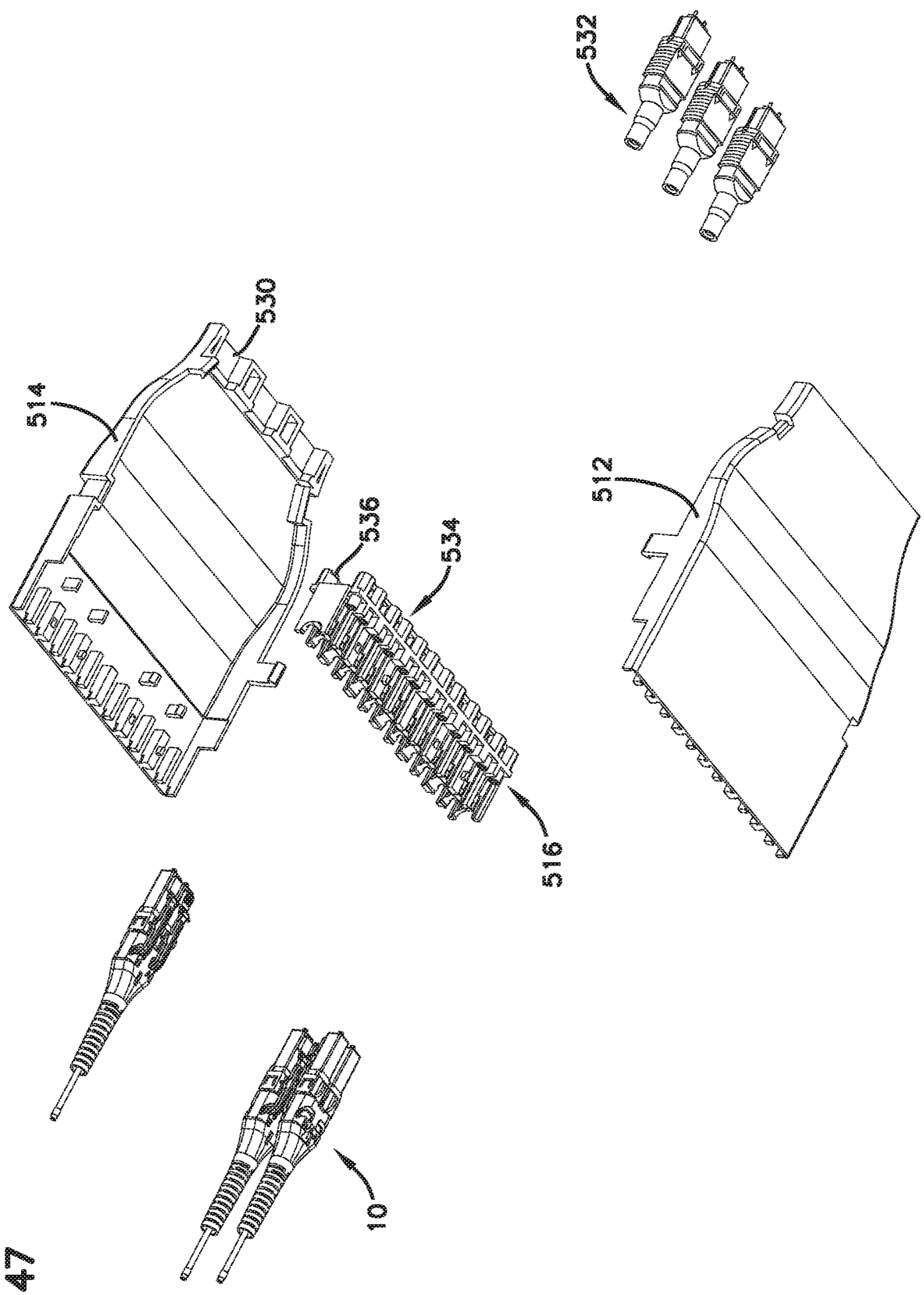
FIG. 47 is a front, bottom, right side perspective view of the cassette of FIG. 46 shown in a fully exploded configuration.
Figure 48:
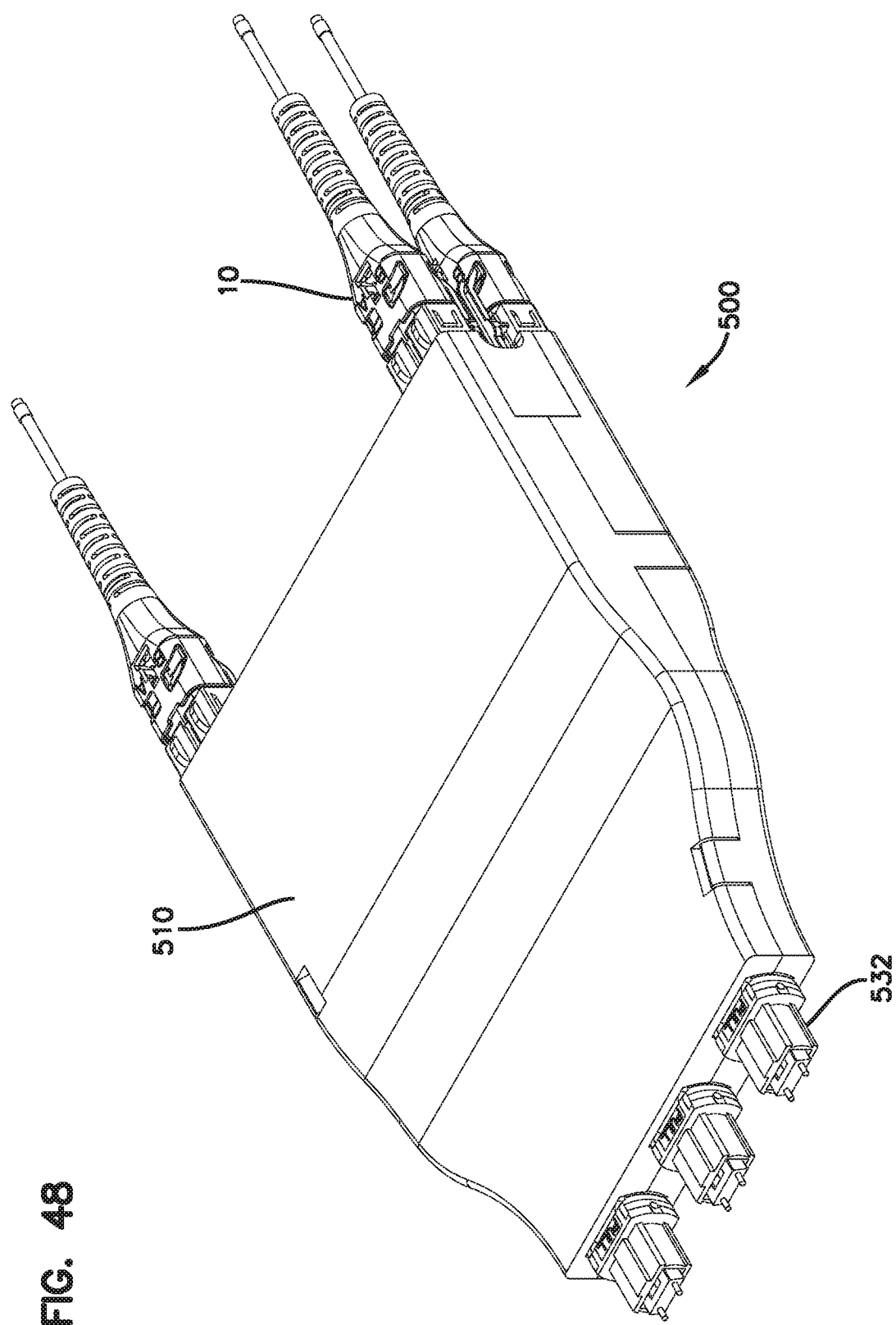
FIG. 48 is a rear, top, left side perspective view of the cassette of FIGS. 44-47 shown in an assembled configuration with the connectors coupled thereto.
Figure 49:
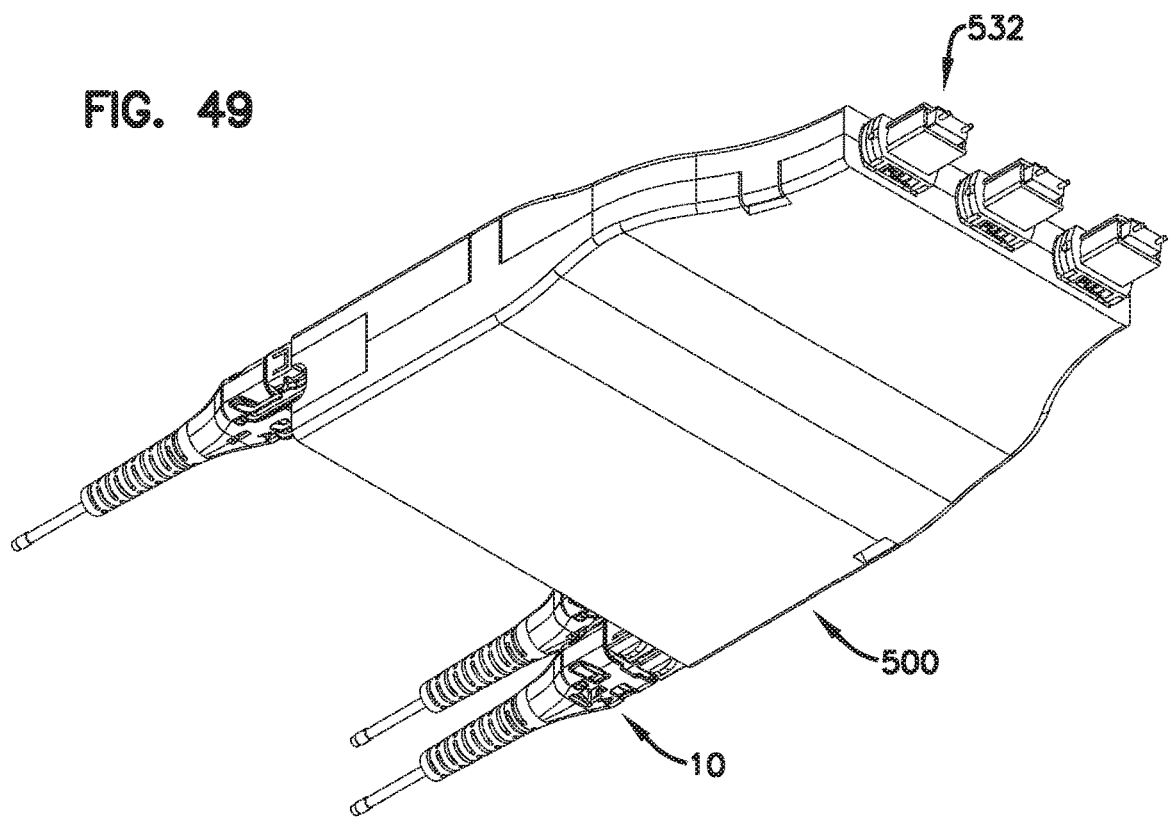
FIG. 49 is a rear, bottom, right side perspective view of the cassette of FIG. 48.
Figure 50:
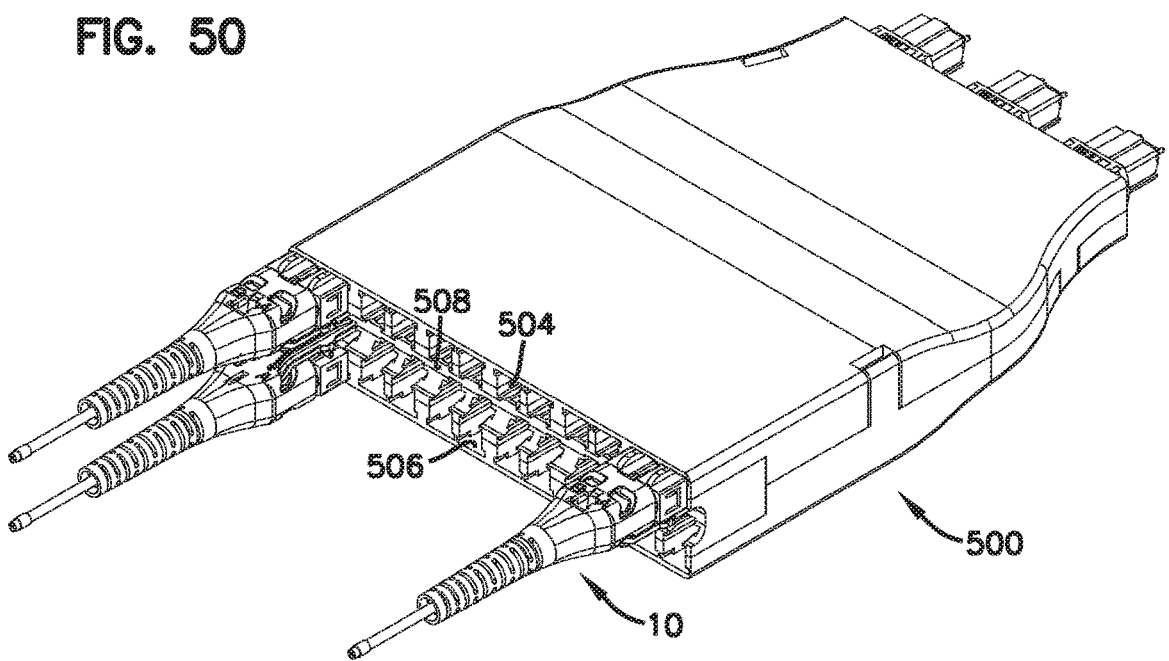
FIG. 50 is a front, top, right side perspective view of the cassette of FIG. 48.
Figure 51:
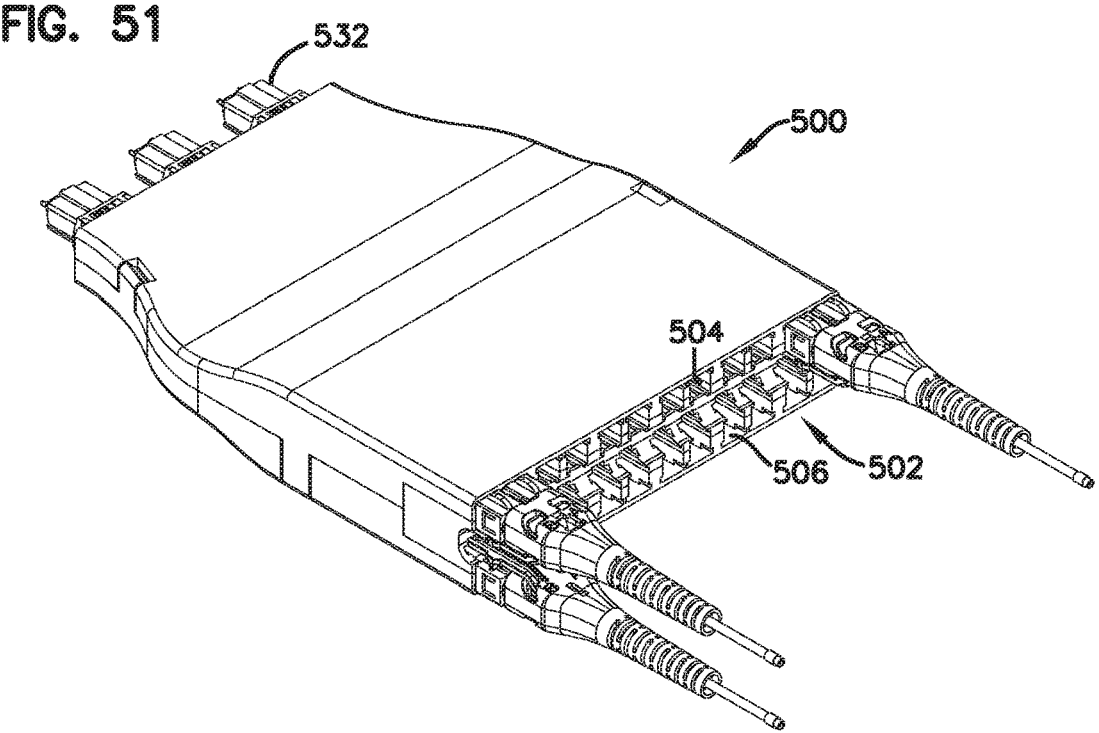
FIG. 51 is a front, top, left side perspective view of the cassette of FIG. 48.
Figure 52:
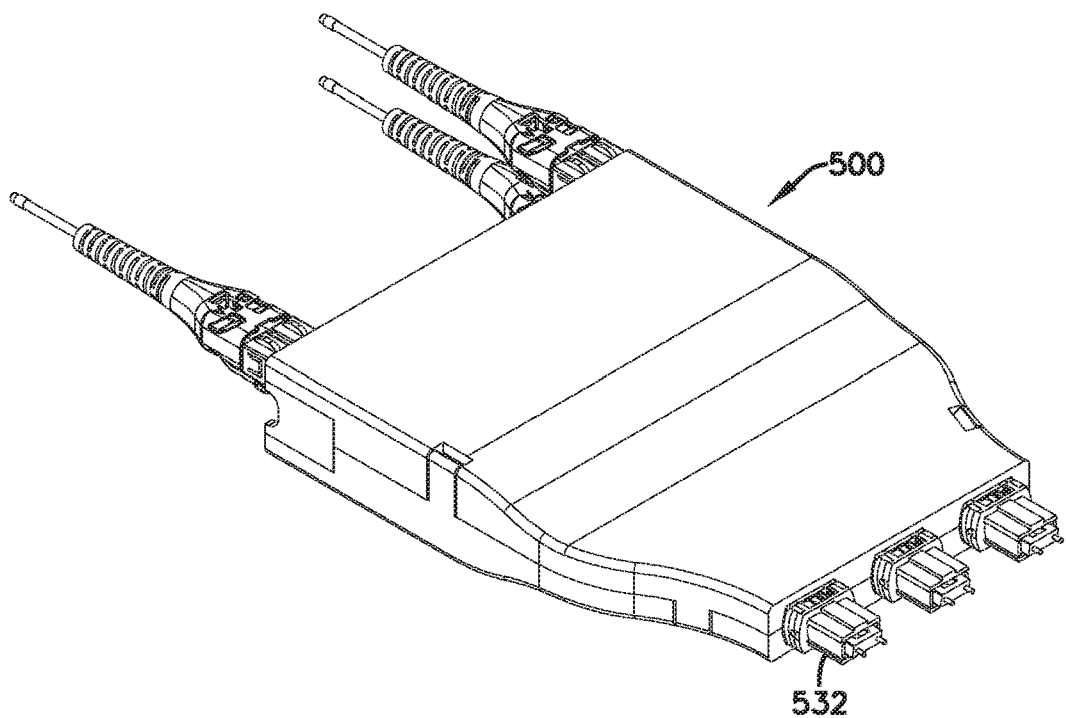
FIG. 52 is a rear, top, right side perspective view of the cassette of FIG. 48.
Figure 53:
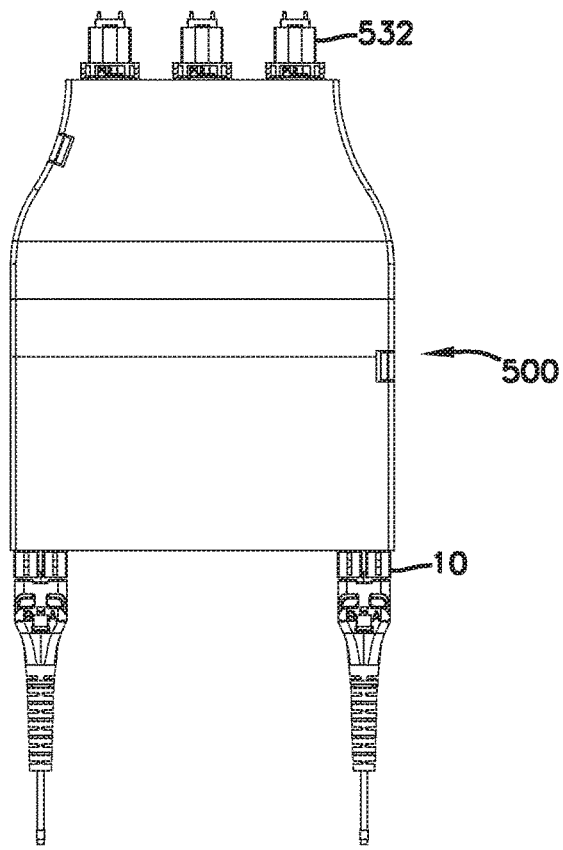
FIG. 53 is a top view of the cassette of FIG. 48.
Figure 54:
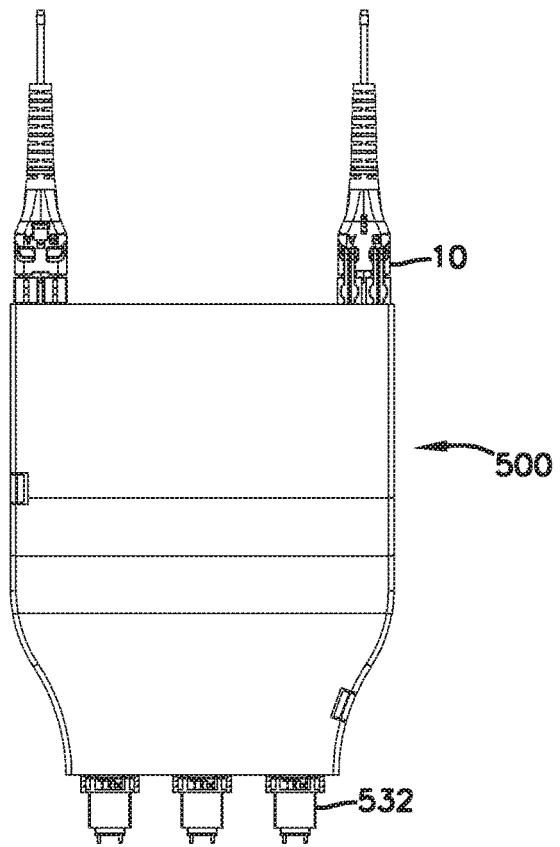
FIG. 54 is a bottom view of the cassette of FIG. 48.
Figure 55:
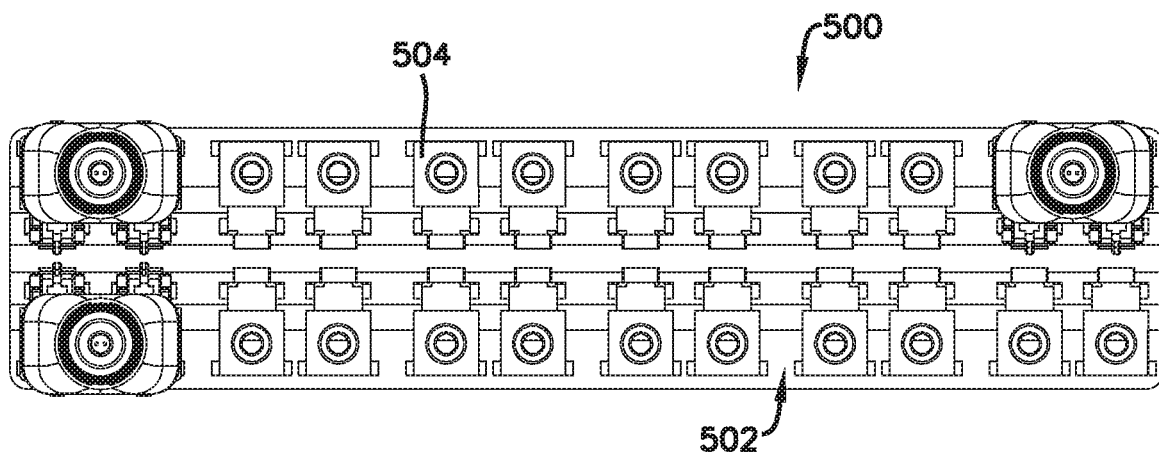
FIG. 55 is a front view of the cassette of FIG. 48.
Figure 56:
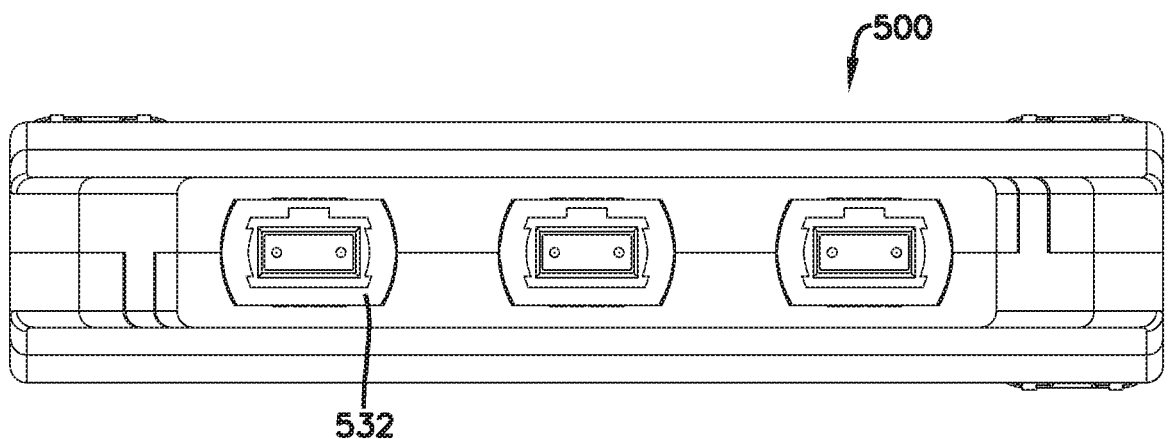
FIG. 56 is a rear view of the cassette of FIG. 48.
Figure 57:
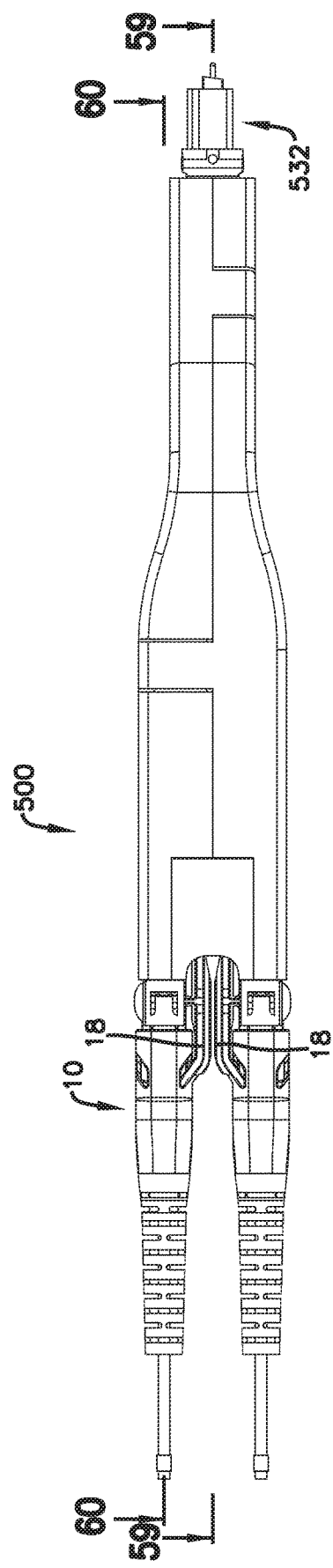
FIG. 57 is a right side view of the cassette of FIG. 48.
Figure 58:
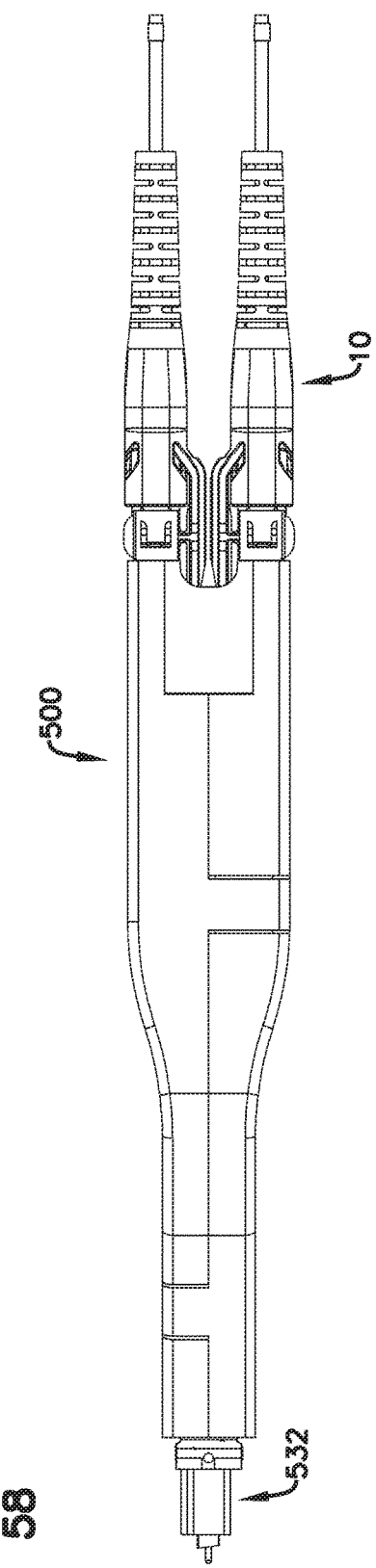
FIG. 58 is a left side view of the cassette of FIG. 48.
Figure 59:
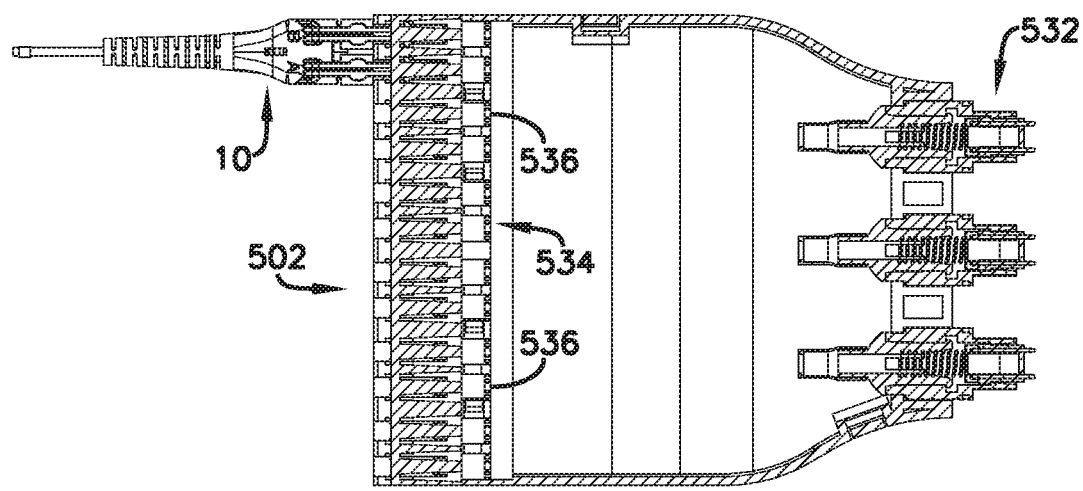
FIG. 59 is a cross-sectional view taken along line 59-59 of FIG. 57.
Figure 60:
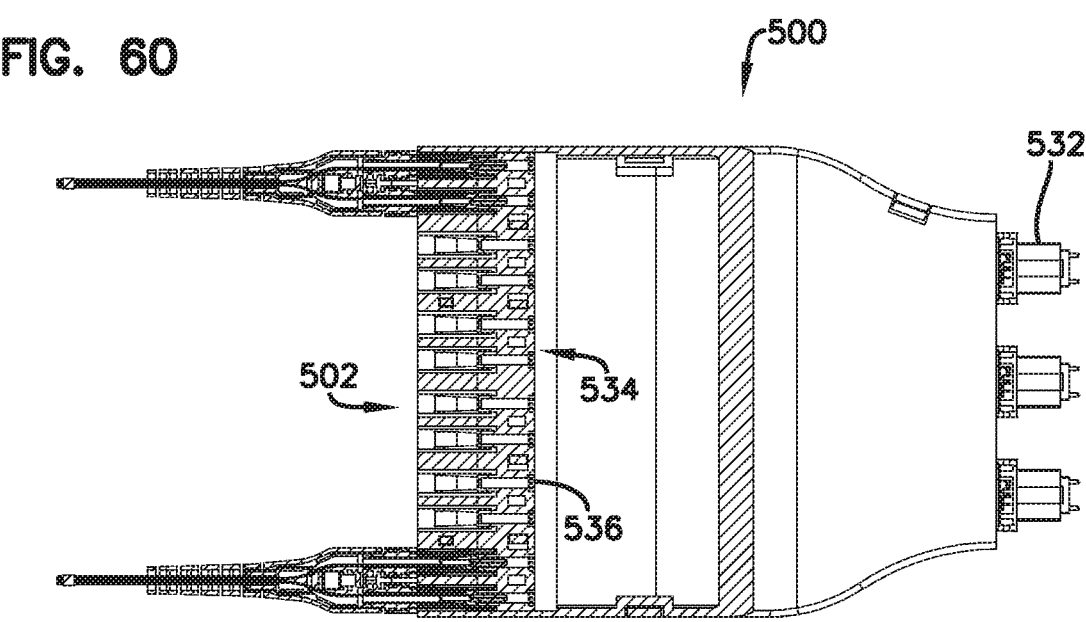
FIG. 60 is a cross-sectional view taken along line 60-60 of FIG. 57.

Even though the adapter 300 discussed above has been described as being a unitarily molded adapter or an adapter wherein a front half and a rear half may be ultrasonically welded or snap-fit together to capture the ferrule alignment sleeves, FIGS. 42-43 illustrate another possible embodiment for forming an adapter 400. In the embodiment shown in FIGS. 42-43, the adapter 400 is depicted as being formed from a center structure 402 that is captured between top and bottom covers 404, 406. As shown, the center structure 402 and the top and bottom covers 404, 406 may include intermating keys 408 and slots 410 for orientation/alignment purposes. As described above with respect to an adapter block that may formed from front and rear halves, the adapter embodiment 400 shown in FIGS. 42-43 may also be ultrasonically welded or coupled with snap interlocks once the parts 402, 404, 406 have been fit together.

Referring now to FIGS. 44-60, instead of being provided as an adapter block 300, 400, the connector port arrangement 302 discussed above may be provided as part of a fiber optic cassette 500. The connector port arrangement 302 may be part of a front panel 502 of the cassette 500, as shown in FIGS. 44-60, wherein the front panel 502 defines upper and lower receptacles 504, 506 and a shared center divider 508, similar to the adapter blocks 300, 400 of FIGS. 26-43.

In the depicted example, similar to the adapter block 400 specifically discussed with respect to FIGS. 42-43, the cassette 500, including the front panel 502 thereof, may be formed from multiple parts that are snapped together to form the cassette 500.

As shown in FIGS. 44-60, the cassette defines a cassette body 510 having a base 512 and a cover 514 that is configured to be snap-fit to the base to capture a center structure 516. The center structure 516 defines the front panel 502. As shown, the center structure 516 may be oriented/aligned with respect to the base 512 (and the cover 514) with intermating keys 518 and slots 520 and also fixed with respect to the base 512 (and the cover 514) with flexible fingers 522. The center structure 516, once in place, is captured between the base 512 and the cover 514.

Once the base 512 and the cover 514 capture the center structure 516 therebetween and the cassette body 510 has been assembled, the cassette body 510 forms a closed interior 524 for routing fibers therein between a front end 526 defined by the cassette body 510 and a rear end 528 defined by the cassette body 510. The front connection panel 502 defined by the center structure 516 is provided at the front end 526. The rear end 528 of the cassette body 510 includes connector ports 530 for receiving connectors 532 (e.g., multi-fiber connectors) carrying fibers to be relayed to the front panel 502 with terminated connectors as will be described in further detail.

It should be noted that in other example embodiments, instead of being part of a removable structure, the front panel 502 may be integrally molded to parts of the cassette body 510 such as the base 512 or the cover 514.

The depicted fiber optic cassette 500 is configured to provide a connection point at the front end 526 utilizing the connectors 10 described above with respect to FIGS. 1-22. At the rear end 528, as shown, the cassette 500 may include the multi-fiber type connectors 532, wherein fibers entering the cassette 500 via the multi-fiber connectors 532 are separated out and relayed to the front panel 502 within the body 510 of the cassette 500. It should be noted that the fibers may simply be separated out and relayed to the front panel 502 in a signal flow-through design that provides for a format-switching cassette 500, wherein the format may be changed from a multi-fiber connector 532 to individual simplex or duplex connectors 10 such as those shown in FIGS. 1-22 or standard LC connectors. In certain examples, the fibers may be provided as loose fibers within the body 510 of the cassette 500 or may be provided as part of a flexible circuit utilizing a flexible substrate that fixes the fibers as they are relayed from the rear connectors 532 to the front panel 502. In further examples, the fibers within the cassette 500 may be processed via optical devices such as fan-outs, splitters, multiplexers, filters, couplers, etc. before being relayed to the front panel 502 for connection.

In the depicted example, as shown in FIGS. 46, 47, 59, and 60, the center structure 516 and the front panel 502 defined thereby may be configured such that, while the external receptacles 504, 506 are configured for receiving standard fiber optic connectors 10, an internal side 534 of the panel 502 is configured with non-standard adapter receptacles 536 such as those shown and described in U.S. Pat. Nos. 9,535,229; 9,488,788; and 9,223,094, the disclosures of which are incorporated herein in their entireties. In such examples, the fibers within the interior 524 of the cassette 500 extending from the rear connectors 532 to the front panel 502 may be terminated with non-conventional connectors that are coupled to the internal side 534 of the front panel 502. Such non-conventional connectors may mate with standard format fiber optic connectors 10 coupled to the upper and lower receptacles 504, 506 of the front connection panel 502, coming from an exterior of the cassette 500. When mating standard and non-standard type connectors, each adapter may still include a standard alignment sleeve therewithin for aligning the ferrules of the mated connectors.

In other examples, the front panel 502 of the cassette 500 may be provided with a full adapter block configuration that mates standard fiber optic connectors 10 from both the external side and the internal side. In such an example, the separated out fibers coming from the multi-fiber connectors 532 would be terminated with standard type fiber optic connectors 10 that are coupled to the internal side 534 of the front panel 502.

It should also be noted that although only a fiber optic cassette 500 has been shown to include a connection panel 502 that is configured to mate external standard connectors and internal non-conventional connectors, such an arrangement may be provided in the adapter blocks 300, 400 discussed above with respect to FIGS. 26-43. Such an adapter block 300, 400 may be provided as a stand-alone structure or be mounted in a removable manner to different optical devices such as fiber optic cassettes for defining the front panels of such cassettes, as discussed above.

The above specification, examples and data provide a complete description of the manufacture and use of the inventive concepts. Since many embodiments of the disclosure can be made without departing from the spirit and scope thereof, the inventive concepts reside in the claims hereinafter appended.

What is claimed is:

1. A fiber optic connector port arrangement, the connector port arrangement comprising:
at least one upper receptacle and at least one lower receptacle vertically aligned with the upper receptacle to form a column of receptacles, the column including a center divider that divides the at least one upper receptacle from the at least one lower receptacle, the center divider defining a first pair of latching shoulders for mating with a latch of a connector to be mounted at the upper receptacle of the column, the center divider also defining a second pair of latching shoulders for mating with a latch of a connector to be mounted at the lower receptacle of the column, wherein the first pair of latching shoulders and the second pair of latching shoulders are vertically aligned.

2. A fiber optic connector port arrangement according to claim 1, further comprising a plurality of the columns of vertically aligned upper and lower receptacles.

3. A fiber optic connector port arrangement according to claim 2, wherein the plurality of columns includes twelve columns of vertically aligned upper and lower receptacles.

4. A fiber optic connector port arrangement according to claim 1, wherein the connector port arrangement is part of a fiber optic adapter defining ports at both a front end and a rear end for optically mating fiber optic connectors.

5. A fiber optic connector port arrangement according to claim 4, wherein the fiber optic adapter is a unitarily molded structure with a ferrule alignment sleeve inserted therein.

6. A fiber optic connector port arrangement according to claim 4, wherein the fiber optic adapter defines symmetric ports at both the front and rear ends of the adapter for mating similar fiber optic connectors.

7. A fiber optic connector port arrangement according to claim 4, wherein the fiber optic adapter defines dissimilar ports at the front and rear ends for mating two different types of connectors.

8. A fiber optic connector port arrangement according to claim 7, wherein one of the mated connectors is a standard format connector and the other of the mated connectors is a non-conventional connector, each still including a fiber optic ferrule.

9. A fiber optic connector port arrangement according to claim 8, wherein the standard format connector is an LC format connector.

10. A fiber optic connector port arrangement according to claim 2, wherein the connector port arrangement defines at least a part of a front panel of a fiber optic cassette having a cassette body defining an interior for routing fibers therein.

11. A fiber optic connector port arrangement according to claim 10, wherein the cassette defines a front end including the front panel and a rear end including further connector ports.

12. A fiber optic connector port arrangement according to claim 11, wherein the connector ports at the rear end of the cassette are configured to receive multi-fiber connectors carrying fibers to be relayed to the front panel with terminated connectors.

13. A fiber optic connector port arrangement, the connector port arrangement comprising:
at least one upper receptacle and at least one lower receptacle vertically aligned with the upper receptacle to form a column of receptacles, wherein the connector port arrangement is configured to receive fiber optic connectors having latches that define a top side and a bottom side, the latches being configured to be pivotally flexible in a direction from the top side to the bottom side, wherein the connector port arrangement is configured to orient the fiber optic connectors latched to the upper and lower receptacles of the column such that the top sides of the latches of the fiber optic connectors face and are positioned adjacent each other.

14. A fiber optic connector port arrangement according to claim 13, further comprising a plurality of the columns of vertically aligned upper and lower receptacles.

15. A fiber optic connector port arrangement according to claim 13, wherein the connector port arrangement is part of a fiber optic adapter defining ports at both a front end and a rear end for optically mating fiber optic connectors.

16. A fiber optic connector port arrangement according to claim 15, wherein the fiber optic adapter is a unitarily molded structure with a ferrule alignment sleeve inserted therein.

17. A fiber optic connector port arrangement according to claim 15, wherein the fiber optic adapter defines symmetric ports at both the front and rear ends of the adapter for mating similar fiber optic connectors.

18. A fiber optic connector port arrangement according to claim 14, wherein the connector port arrangement defines at least a part of a front panel of a fiber optic cassette having a cassette body defining an interior for routing fibers therein.

19. A fiber optic connector port arrangement according to claim 18, wherein the cassette defines a front end including the front panel and a rear end including further connector ports.

20. A fiber optic connector port arrangement according to claim 19, wherein the connector ports at the rear end of the cassette are configured to receive multi-fiber connectors carrying fibers to be relayed to the front panel with terminated connectors.

21. A dual-layered fiber optic connector port arrangement comprising:
    at least one upper receptacle and at least one lower receptacle vertically aligned with the upper receptacle to form a column of receptacles, wherein the column defines a total height of less than about 0.875 inches, the column including a center divider that divides the at least one upper receptacle from the at least one lower receptacle, the center divider defining a first pair of latching shoulders for mating with a latch of a connector to be mounted at the at least one upper receptacle of the column, the center divider also defining a second pair of latching shoulders for mating with a latch of a connector to be mounted at the at least one lower receptacle of the column, wherein the first pair of latching shoulders and the second pair of latching shoulders are vertically aligned,
    wherein the connector port arrangement is configured such that each of the at least one upper receptacle and the at least one lower receptacle is configured to receive a connector having a latch that defines a top side and a bottom side, the latch of the connector being configured to be pivotally flexible in a direction from the top side to the bottom side, wherein the connector port arrangement is configured to orient a connector latched to the upper receptacle and a connector latched to the lower receptacle of the column such that the top sides of the latches of the connectors face and are positioned adjacent each other.

22. A dual-layered fiber optic connector port arrangement according to claim 21, wherein the column defines a total height of less than about 0.75 inches.

23. A dual-layered fiber optic connector port arrangement according to claim 21, further comprising a plurality of the columns of vertically aligned upper and lower receptacles.

24. A dual-layered fiber optic connector port arrangement according to claim 21, wherein the connector port arrangement is part of a fiber optic adapter defining ports at both a front end and a rear end for optically mating fiber optic connectors.

25. A dual-layered fiber optic connector port arrangement according to claim 24, wherein the fiber optic adapter is a unitarily molded structure with a ferrule alignment sleeve inserted therein.

26. A dual-layered fiber optic connector port arrangement according to claim 24, wherein the fiber optic adapter defines symmetric ports at both the front and rear ends of the adapter for mating similar fiber optic connectors.

27. A dual-layered fiber optic connector port arrangement according to claim 21, wherein the connector port arrangement defines at least a part of a front panel of a fiber optic cassette having a cassette body defining an interior for routing fibers therein.

28. A dual-layered fiber optic connector port arrangement according to claim 27, wherein the cassette defines a front end including the front panel and a rear end including further connector ports.

29. A dual-layered fiber optic connector port arrangement according to claim 28, wherein the connector ports at the rear end of the cassette are configured to receive multi-fiber connectors carrying fibers to be relayed to the front panel with terminated connectors.

* * * * *